United States Patent
Tsao

(10) Patent No.: US 8,396,891 B2
(45) Date of Patent: Mar. 12, 2013

(54) METHOD AND APPARATUS OF DYNAMIC UPDATING WEB PORTALS

(75) Inventor: Sheng Tai (Ted) Tsao, San Jose, CA (US)

(73) Assignee: STT Web OS, Inc., San Jose, CA (US)

( * ) Notice: Subject to any disclaimer, the term of this patent is extended or adjusted under 35 U.S.C. 154(b) by 0 days.

(21) Appl. No.: 13/326,178

(22) Filed: Dec. 14, 2011

(65) Prior Publication Data
US 2012/0089589 A1 Apr. 12, 2012

Related U.S. Application Data

(63) Continuation of application No. 12/511,039, filed on Jul. 28, 2009, which is a continuation-in-part of application No. 11/732,496, filed on Apr. 2, 2007, which is a continuation-in-part of application No. 10/713,904, filed on Aug. 6, 2002, now Pat. No. 7,418,702, and a continuation-in-part of application No. 10/713,905, filed on Aug. 12, 2002, now Pat. No. 7,379,990, said application No. 12/511,039 is a continuation-in-part of application No. 11/374,302, filed on Jul. 2, 2004, now Pat. No. 7,945,652, which is a continuation-in-part of application No. 10/713,904, filed on Aug. 6, 2002, now Pat. No. 7,418,702, and a continuation-in-part of application No. 10/713,905, filed on Aug. 12, 2002, now Pat. No. 7,379,990.

(60) Provisional application No. 60/787,653, filed on Mar. 31, 2006.

(51) Int. Cl.
G06F 17/30 (2006.01)

(52) U.S. Cl. ........................................................ 707/781

(58) Field of Classification Search .................. None
See application file for complete search history.

(56) References Cited

U.S. PATENT DOCUMENTS

| | | | |
|---|---|---|---|
| 4,604,494 A * | 8/1986 | Shepard, Jr. | 136/246 |
| 2002/0129106 A1 * | 9/2002 | Gutfreund | 709/205 |
| 2003/0097410 A1 * | 5/2003 | Atkins et al. | 709/206 |
| 2005/0262006 A1 * | 11/2005 | Beartusk et al. | 705/37 |
| 2006/0095514 A1 * | 5/2006 | Wang et al. | 709/204 |
| 2009/0138808 A1 * | 5/2009 | Moromisato et al. | 715/758 |

* cited by examiner

*Primary Examiner* — Syed Hasan
(74) *Attorney, Agent, or Firm* — Foley & Lardner LLP; Antoinette F. Konski; Alex Y. Nie

(57) ABSTRACT

The web portal's contents management becomes complex and sometime tedious job. There are needs for an efficient and cost effective way to manage large volumes of the web contents for web portals. The posting and withdrawing operation of the present invention has provided a means for making the tasks of updating and managing web portal's contents become much easy and efficient due to the principle of the parallelism can be deployed.

5 Claims, 18 Drawing Sheets

Fig. 2 A variation of CCDSVM platform for web-browser based communication:

Fig. 2B: A variation of CCSDVM platform, the degenerated CCDSVM with only control system and without provisioned systems, and to be accessed by massive client systems. (The like elements has same reference number)

Fig. 4A: Dynamic work space (central location for share) on Control system.

Fig. 4B: an example of resource may be assigned to a user-group common work space.

Fig. 4C: an example of user private work space.

Fig. 5: An example of resource objectives on systems and can be assigned to each group or each user' work space.

Fig. 6A: An example of displaying a web-page with 4 sections in web-browser of user X in user-group-1 during an interactive online meeting.

Fig. 6B: An example of displaying a web-page with 4 sections in web-browser of user Y in user-group-1 during interactive online meeting.

group-1 before interactive online meeting.

Fig. 6D: An example of display a web-page with 4 sections in browser of user Y in user group-1 before interactive online meeting.

Fig. 6E: An example of displayed web-page that each massive online user can access and view from each of their browser without login to CCDSVM during said user X and user Y in user-group-1 online meeting.

Fig. 7A: Non-group based one-to-one peer-to-peer post messages and folders of user X Fig. 7B: Non-group based one-to-one peer-to-peer post messages and folders of user Y Fig. 8A: An example web graphic presentation view of assigned resources in a user X's private work space.

Fig. 8B examples of web-based graphic presentation of assigned resource in the private work space of user Y.

Fig. 8C: An example web graphic presentation view of user Y's private work space after user X dynamically posted and shared "folder 2" in user X's private space.

Fig. 9A: an example of pop-up menu for folder

Fig. 9B an example of pop-up menu for file

Fig. 10A an example of non pop-up operation menu for folder:

Fig. 10B an example of non pop-up operation menu for folder:

Fig. 11: an example of center view of list of posted files or folders in file & folder area of a private work space of a user X in a special personal share management section of a web-page.

| File or Folder Name | On System | Share to Who | |
|---|---|---|---|
| My-video jpg file | System-1 | Jane | Delete shared? |
| Project plan | Engineer-3 | Jim | Delete shared? |
| C program code for web | Support-2 | John | Delete shared? |
| Picture of building | System-1 | Jane | Delete shared? |
| Engineer Drawing | Engineer-3 | Jim | Delete shared? |
| Patent application-v1 | System-1 | Ted | Delete shared? |
| Folder 2 | System 2 of system group-A | User Y | Delete shared? |
| | | | |
| | | | |
| | | | |

Fig. 11

METHOD AND APPARATUS OF DYNAMIC UPDATING WEB PORTALS

CROSS-REFERENCE TO RELATED APPLICATIONS

This application is a continuation under 35 U.S.C. §120 of U.S. patent application Ser. No. 12/511,039, filed Jul. 28, 2009, which in turn is a continuation-in-part of (a) U.S. patent application Ser. No. 11/732,496, filed Apr. 2, 2007, which in turn claims the benefit of U.S. Provisional Application No. 60/787,653, filed Mar. 31, 2006, and is a continuation-in-part of U.S. patent application Ser. No. 10/713,904, filed Aug. 6, 2002, now U.S. Pat. No. 7,418,702, and U.S. patent application Ser. No. 10/713,905, filed Aug. 12, 2002, now U.S. Pat. No. 7,379,990, and (b) U.S. patent application Ser. No. 11/374,302, filed Jul. 2, 2004, now U.S. Pat. No. 7,945,652, which in turn is a continuation-in-part of U.S. patent application Ser. No. 10/713,904, filed Aug. 6, 2002, now U.S. Pat. No. 7,418,702, and U.S. patent application Ser. No. 10/713,905, filed Aug. 12, 2002, now U.S. Pat. No. 7,379,990, the entire disclosures of which are all hereby incorporated by reference in their entireties for all purposes.

FIELD OF THE INVENTION

The present invention generally relates to communications network. More specifically, the present invention relates to web based communications system.

BACKGROUND OF THE INVENTION

With increasing popularity of using the Internet and World Wide Web ("the Web") for the rapidly changing digital world, individuals as well as enterprises, exchange (or swap) large volumes of information through the Web. The demand for larger and faster information exchange has increasingly grown in recent years. For example, various business meetings and conferences are conducted over the Web with attendees scattered around the world. To enhance the communication between the meeting attendees, not only voice (and/or image) information is important, but also information exchange can be critical.

Fast, volume, and secure information exchange is important in enhancing the efficiency of a communications network. At Internet era, the web portals become a means for personal, group, or organizational communication. Therefore, an efficiency and cost effective method of creating and updating web portal becomes critical to each business and individuals.

Accordingly, there is a need in the art to provide a faster, more secure, volume information exchange over the Web.

SUMMARY OF THE INVENTION

The present invention relates to a method and apparatus for information exchange over a web environment.

With the development of central controlled distributed scalable virtual machine (CCDSVM) and the web-based computer user working (operating) environment (WCUWE), the problems mentioned in the previous section can easily be solved by introducing a "dynamic workspace" technology of this invention within the frameworks of CCDSVM and WCUWE.

With dynamic workspace technology, one or more login users of CCDSVM, each using a browser of any system and from anywhere, can instantly perform tasks. For example, each user can post or un-post messages, files, folders, or other resources information on systems of CCDSVM with group-based model or non-group 1-to-1 model to one or more audiences on the network. This technology will also achieve larger scales of secure information exchange without size limitation and the installation of special software. Specially, this technology can dramatically improve the efficient and cost effectiveness for updating the contents of any existing web portals.

The implementation of this invention has provided users with a web-browser based system that is capable of securing exchanges of messages, files, folders, or other resources information including storage and network resources on systems crossing network domains without size limitation.

Additional features and benefits of the present invention will become apparent from the detailed description, figures, and claims set forth below.

BRIEF DESCRIPTION OF THE DRAWINGS

The present invention will be understood more fully from the detailed description given below and from the accompanying drawings of various embodiments of the invention, which, however, should not be taken to limit the invention to the specific embodiments, but are for explanation and understanding only.

The resource information also can be the information of the hardware resources on the provisioned system and control system such as one or more network devices such as Ethernet or wireless cards, storage devices such as SCSI or RAID disk, memories, CPUs, and one or more user interface (input/output) devices such as keyboard, mouse, monitor and displaying devices, and audio and video recoding or playback devices and components including digital camera or video and audio encoding cards etc. and there is no limits.

The resource also could be data resource on said system such as one or more file systems built on one or more storage devices, one or more file-folders and various type of data files or application files on said each file system, or one or more record file such as user account or user-group profiles or one or more message data, wherein said data file can be document file such as Word or PDF or Spreadsheet or PowerPoint or plain text file, or media data of streaming video or audio file including AVI, MPEG, MP3 or JPEG image file, and said application file is binary file such as for web application.

The resources can be kept into one or more information lists and to be stored in database on the storage media of the control system. The database is organized as one or more lists of tables, wherein each of the lists contains a certain type of resources or mixed type of resources. The storage media could be a system's internal storage such as memory or disk drive, for example.

The resource information of this invention can be encoded, displayed and operated as web folder-tree in web browser using multi-layered item list (MLIL) in the memory of control system, wherein each node of said MLIL binds with corresponding operation menu, attributes of said resource and graphic image, wherein said attributes of said resource are resource's name, ID, size, location or address, time stamp, ownership, and so forth without limit. Each node of the MLIL can have its next layer of one or more sub-nodes representing another layer of one or more actual resources.

The resource MLIL can be encoded into web page and be displayed in user's web browser such that said user can interactively select each permitted resource node of MLIL and to perform desired tasks through said operation menu. The list of resources displayed as web folder-tree has been demonstrated in embodiments of present invention such as depicted in FIGS. 7A, 7B, 8A, 8B, and 8C. The folder-tree can be organized and displayed including one or more resource nodes, which are organized into one or more layers and each layer is vertically aligned, right indented and displayed below the layer above it, wherein each node at each layer represents a corresponding resource and can have its next layer one or more nodes for representing the corresponding resource's next layer one or more resources if there are any.

Figure 6A:
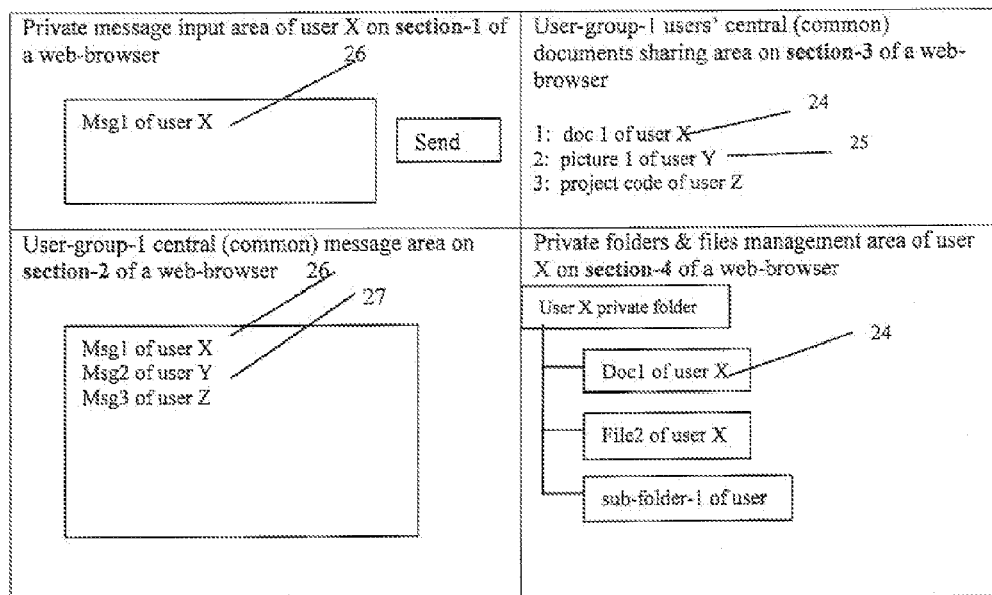

FIG. 6A illustrates an example of displaying a web-page with 4 sections in web-browser of user X in user-group-1 during an interactive online meeting in accordance with one embodiment of the present invention; Each section of a web page can be updated and refreshed automatically and be updated/refreshed independent of other sections by a runtime control script such as a Java script or others, which can be preloaded into the web browser via an encoded web page. Of course, the entire web page also can be updated and refreshed manually by user or by a different control script.

Figure 6B:
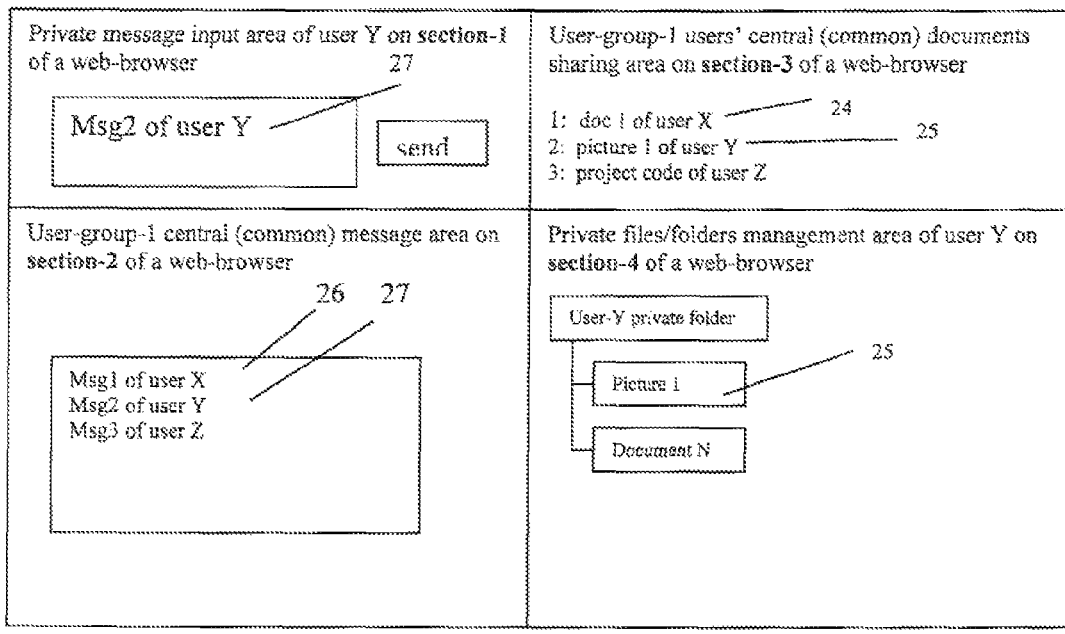

FIG. 6B illustrates an example of displaying a web-page with 4 sections in web-browser of user Y in user-group-1 during interactive online meeting in accordance with another embodiment of the present invention. As mater of the fact, it has illustrates that each web page can be divided into multiple screen sections and each section can be encoded with resources information actually from one or more user's private workspace.

In one embodiment as illustrated in this figure, the user-group-I section encoded with multiple files in group common workspace, which actually posted from three private workspaces by three corresponding users in the group. Also, only the actual owner of each file can from own private workspace to withdraw his previously posted file. For example, the picture I was posted by user Y from his private workspace, therefore, only user Y from his private workspace can be permitted to un-post this previously posted picture I. Similarly, the user-group-I section being encoded and displayed with multiple messages in group common workspace, which actually posted by multiple users from each of own multiple private workspace. Besides, each message can be un-posted by the actual owner of the message from the owner's private workspace.

Figure 6C:
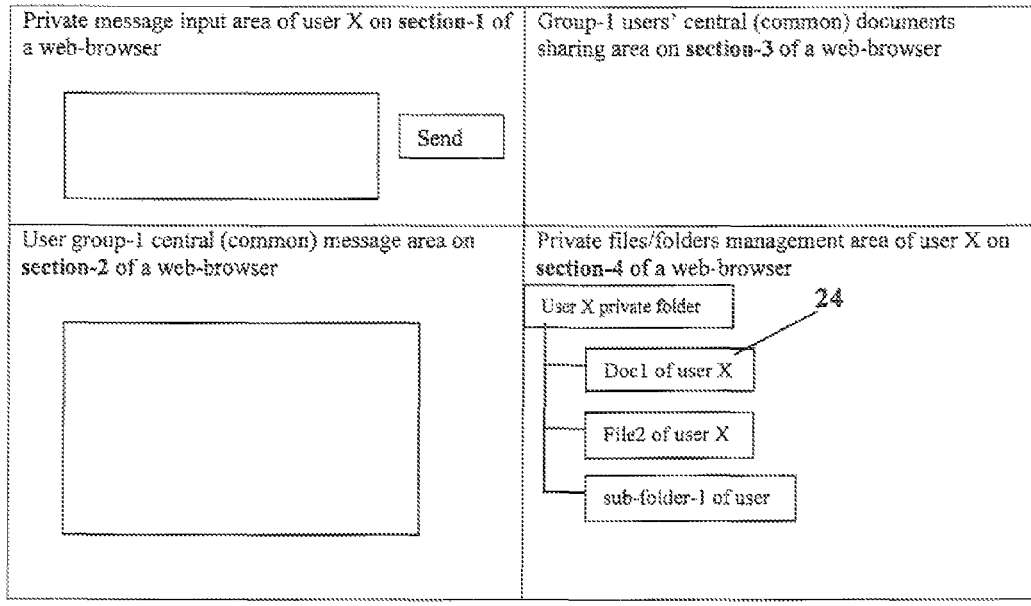

FIG. 6C illustrates an example of displaying a web-page with 4 sections in web-browser of user X in user group-1 before interactive online meeting in accordance with another embodiment of the present invention.

Figure 6D:
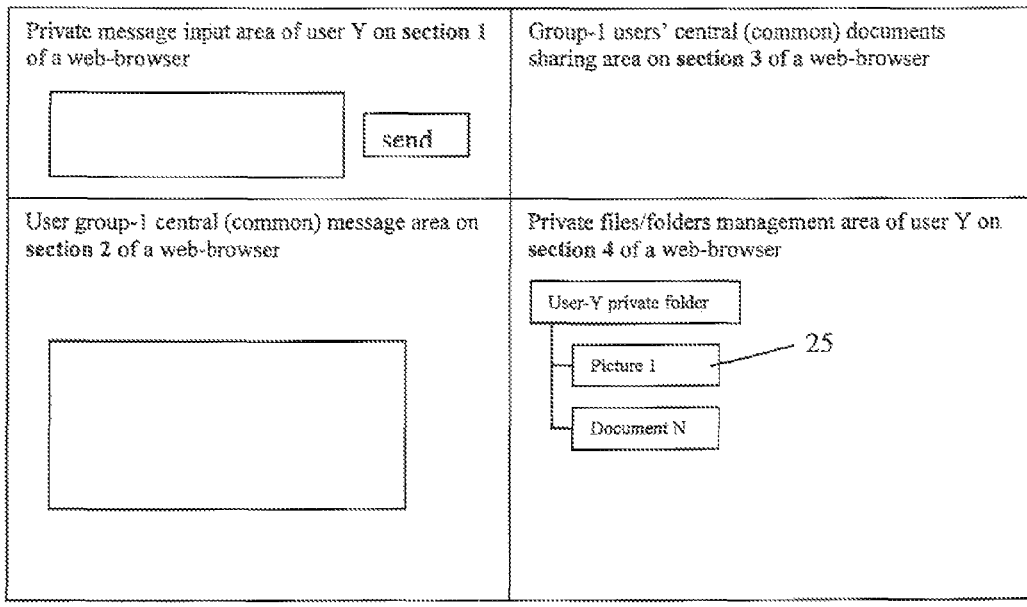

FIG. 6D illustrates an example of displaying a web-page with 4 sections in web-browser of user Y in user group-1 before interactive online meeting in accordance with another embodiment of the present invention.

Figure 6E:
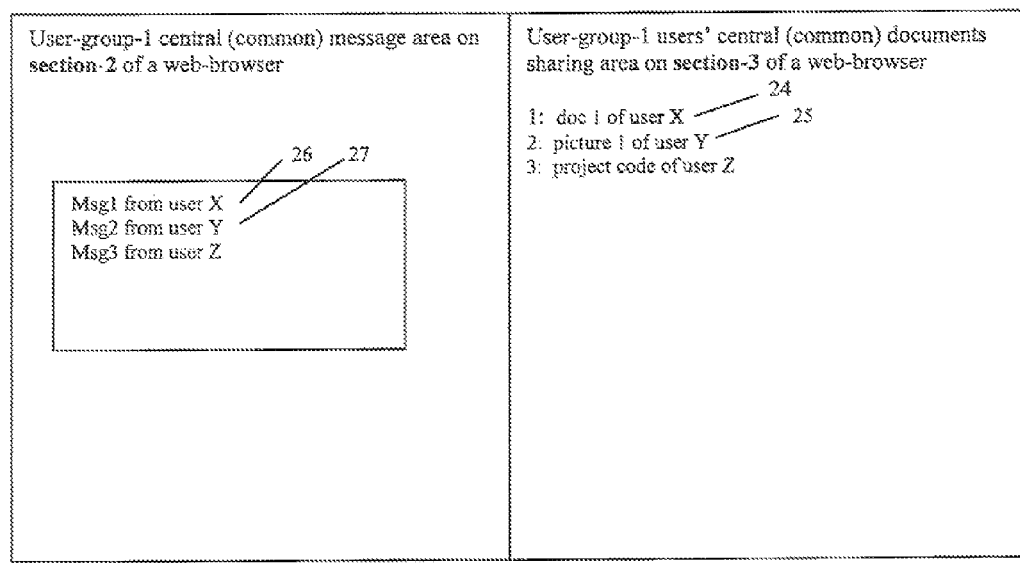

FIG. 6E illustrates an example of a displayed public web-page that each massive online user can access and view from each of their browser without login to CCDSVM during said user X and user Y in user-group-1 online meeting in accordance with another embodiment of the present invention.

Figure 7A:
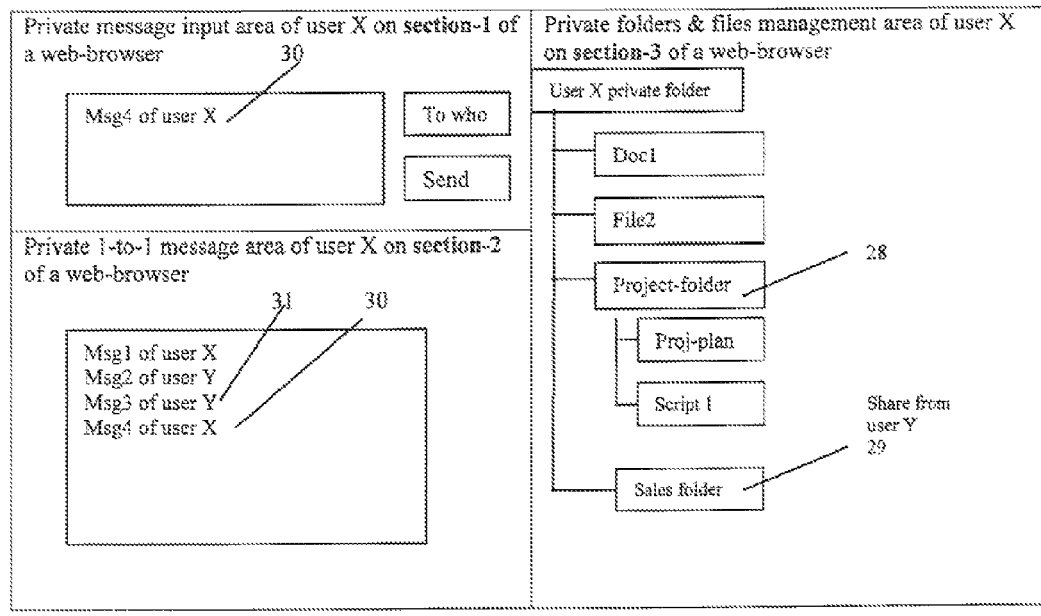

FIG. 7A illustrates one-to-one, peer-to-peer post or un-post messages and folders of user X in accordance with one embodiment of the present invention. As matter of the fact, this also has illustrated that a section of web page can be encoded with information in multiple private workspaces because the displayed user-X's private workspace also includes information posted from another user-Y's private workspace such as "Sales folder", which only user-Y can withdraw it via his private workspace.

Figure 7B:
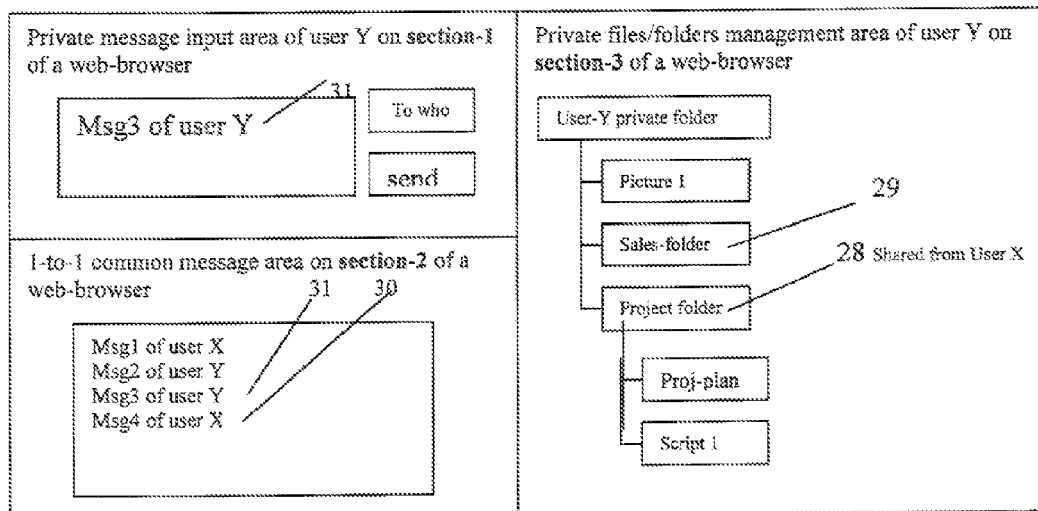

FIG. 7B illustrates one-to-one, peer-to-peer post or un-post messages and information of folders of user Y in accordance with another embodiment of the present invention.

Figure 8A:
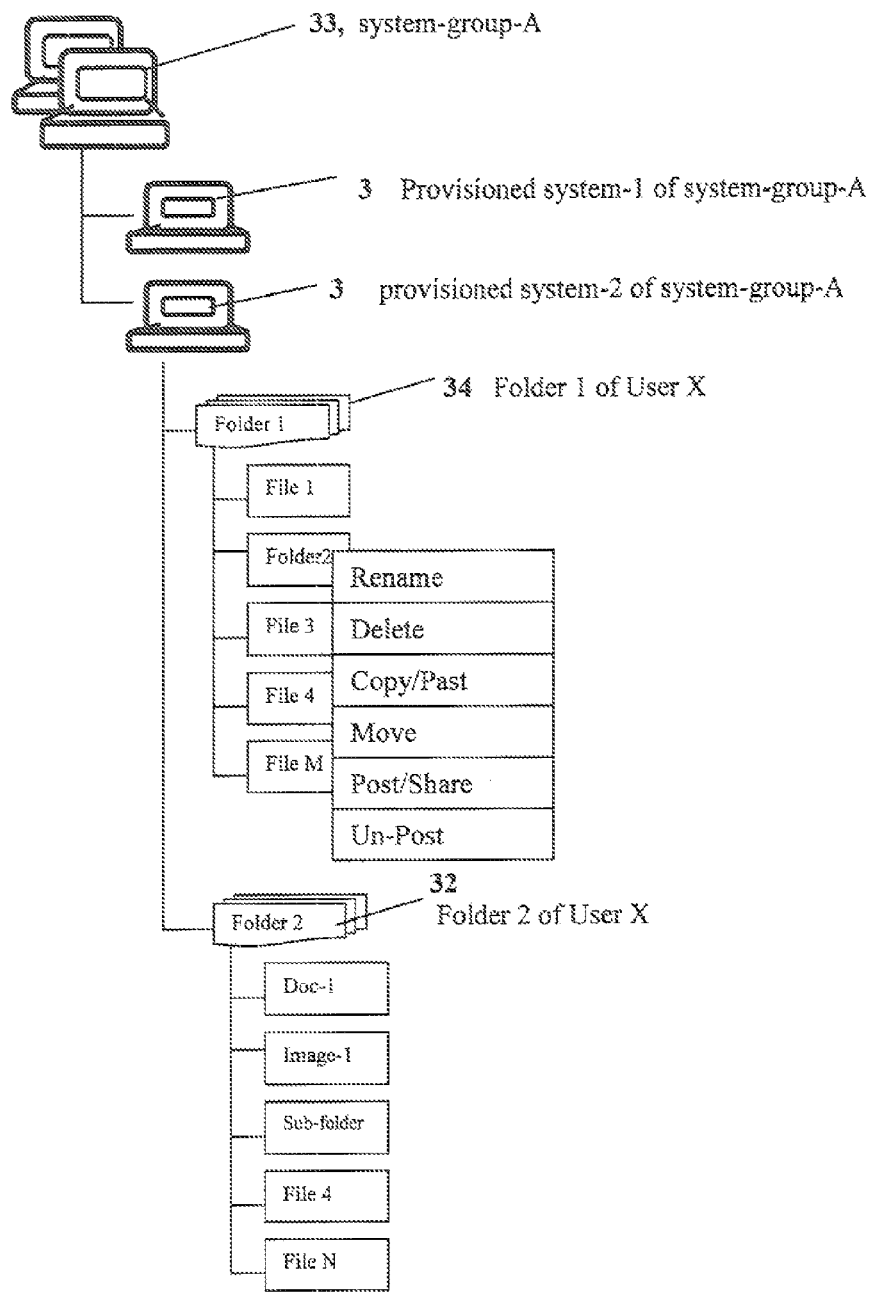

FIG. 8A is an example of a web-based graphic presentation view of assigned resources in a user X's private workspace in accordance with one embodiment of the present invention.

Figure 8B:
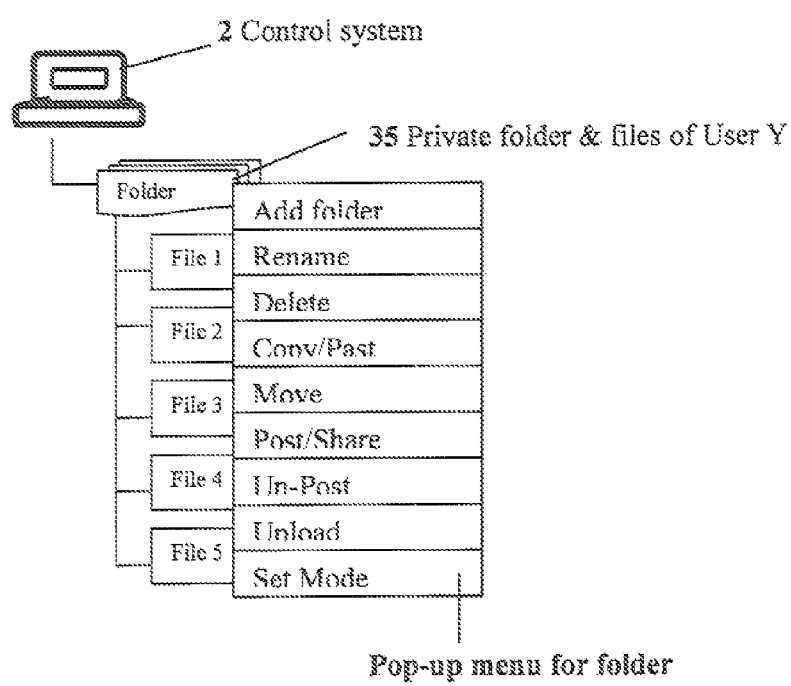

FIG. 8B is an example of a web-based graphic presentation of assigned resource in the private workspace of user Y in accordance with another embodiment of the present invention.

Figure 8C:
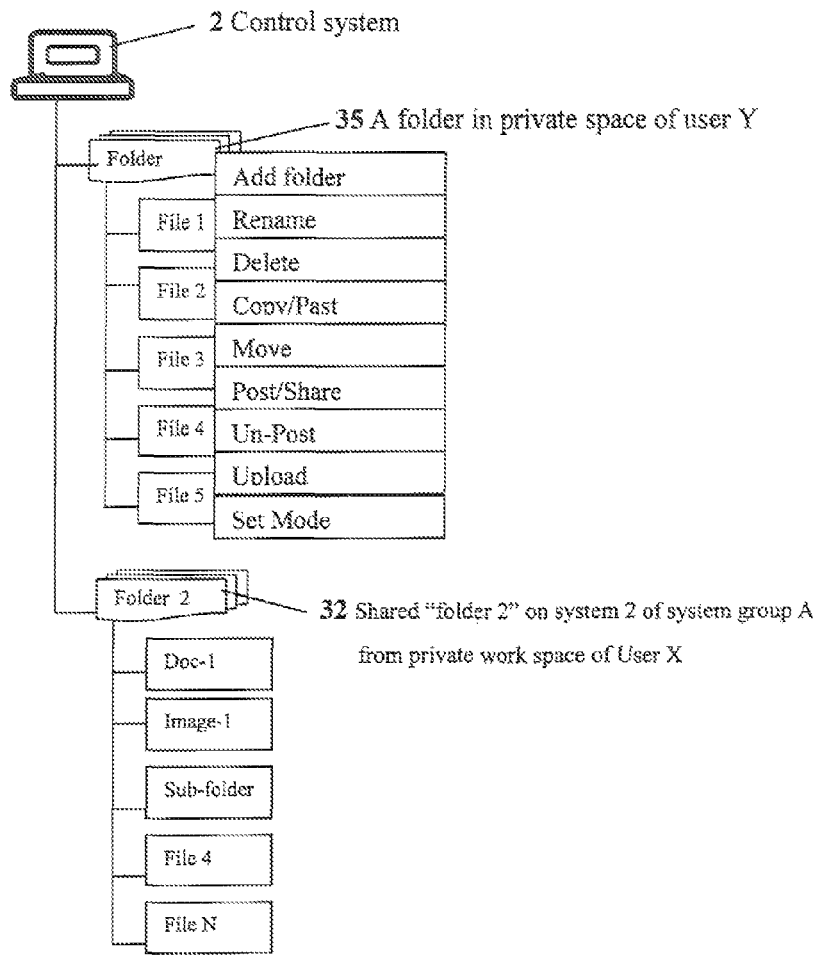

FIG. 8C is an example of a web-based graphic presentation view of user Y's private workspace after user X dynamically posted and shared "folder 2" in user X's private space in accordance with another embodiment of the present invention.

The FIGS. 7A, 7B, 8A, 8B, and 8C also have illustrated that how does the web folder-tree can be used to organize resources in workspaces for efficient operating and managing resource during communication and sharing activities. The web folder-tree can be operated in similar way as native window based folder-tree; A user can select a node to expand and display its sub-nodes if there are any, and said user also can select a previously expanded node to collapse and hide all its sub-nodes from displaying. Therefore, said user can continuously browser and expand said sub-node of a folder-tree as long as there are next level of resource nodes until find a targeted resource node. Since each node is bound with operation menu associated with one or more options of different tasks, the entire displayed resource folder-tree can be conveniently accessed and operated.

Figure 9A:
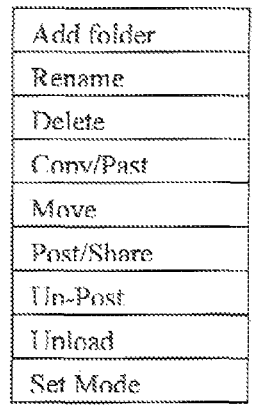

FIG. 9A is an example of a pop-up menu for folder in accordance with one embodiment of the present invention.

Figure 9B:
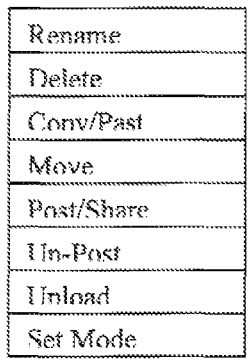

FIG. 9B is an example of a pop-up menu for file in accordance with another embodiment of the present invention.

Figure 10A:
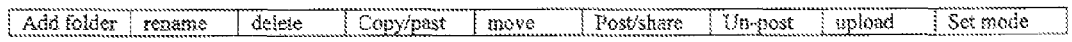

FIG. 10A is an example of a non pop-up operation menu for folder in accordance with one embodiment of the present invention.

Figure 10B:
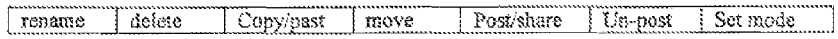

FIG. 10B is an example of a non pop-up operation menu for folder in accordance with another embodiment of the present invention.

FIG. 11 is an example of a center view of a list of posted files or folders in sharable file & folder area of a common workspace of a user X, through witch the user X can smoothly manage the massive sharing information for participating one or more 1-to-1 communication with different communication partners, or participating group model communication in accordance with one embodiment of the present invention.

Figure 12:
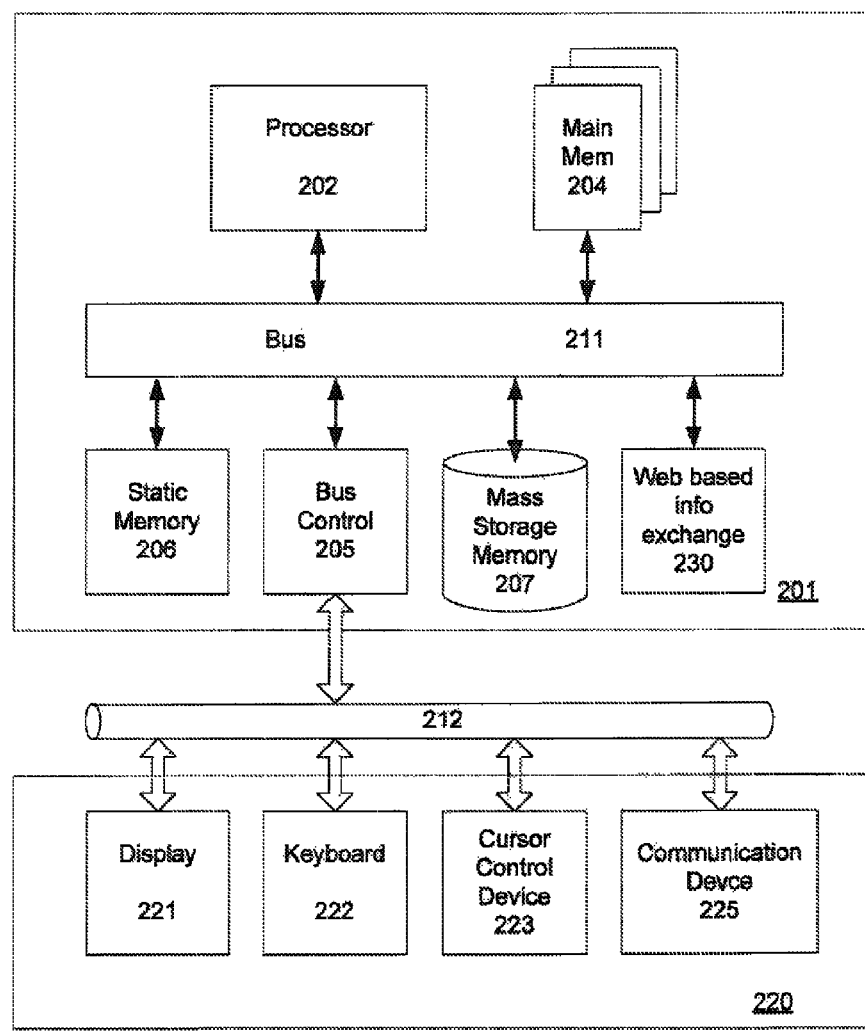

FIG. 12 has illustrated a computer system and its components.

DETAILED DESCRIPTION

Embodiments of the present invention are described herein in the context of a method, system and apparatus for providing a web based communications network with fast, volume, and secure information exchange. Those of ordinary skill in the art will realize that the following detailed description of the present invention is illustrative only and is not intended to be in any way limiting. Other embodiments of the present invention will readily suggest themselves to such skilled persons having the benefit of this disclosure. Reference will now be made in detail to implementations of the present invention as illustrated in the accompanying drawings. The same reference indicators will be used throughout the drawings and the following detailed description to refer to the same or like parts.

In the interest of clarity, not all of the routine features of the implementations described herein are shown and described. It will, of course, be appreciated that in the development of any such actual implementation, numerous implementation-specific decisions must be made in order to achieve the developer's specific goals, such as compliance with application and business-related constraints, and that these specific goals will vary from one implementation to another and from one developer to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures described herein may be implemented using various combined types of operating systems, computing platforms, computer programs including various software modules, and/or general purpose machines. In addition, those of ordinary skill in the art will recognize that devices of a less general purpose nature, such as hardwired devices, field programmable gate arrays (FPGAs), application specific integrated circuits (ASICs), or the like, may also be used without departing from the scope and spirit of the inventive concepts disclosed herein. Where a method comprising a series of process steps is implemented by a computer or a machine and those process steps can be stored as a series of instructions readable by the machine, they may be stored on a tangible medium such as a computer memory device (e.g., ROM (Read Only Memory), PROM (Programmable Read Only Memory), EEPROM (Electrically Eraseable Programmable Read Only Memory), FLASH Memory, Jump Drive, and the like), magnetic storage medium (e.g., tape, magnetic disk drive, and the like), optical storage medium (e.g., CD-ROM, DVD-ROM, paper card and paper tape, and the like) and other known types of program memory.

Those of ordinary skill in the art will realize that the following detailed description of the present invention is illustrative only and is not intended to be in any way limiting. Other embodiments of the present invention will readily suggest themselves to such skilled persons having the benefit of this disclosure. It will be apparent to one skilled in the art that these specific details may not be required to practice to present invention. In other instances, well-known circuits and devices are shown in block diagram form to avoid obscuring the present invention. In the following description of the embodiments, substantially the same parts are denoted by the same reference numerals.

While particular embodiments of the present invention have been shown and described, it will now be apparent to those skilled in the art having the benefit of this disclosure that many more modifications than mentioned above are possible without departing from the inventive concepts disclosed herein. Therefore, the appended claims are intended to encompass within their scope all such modifications as are within the spirit and scope of this invention.

Figure 1:
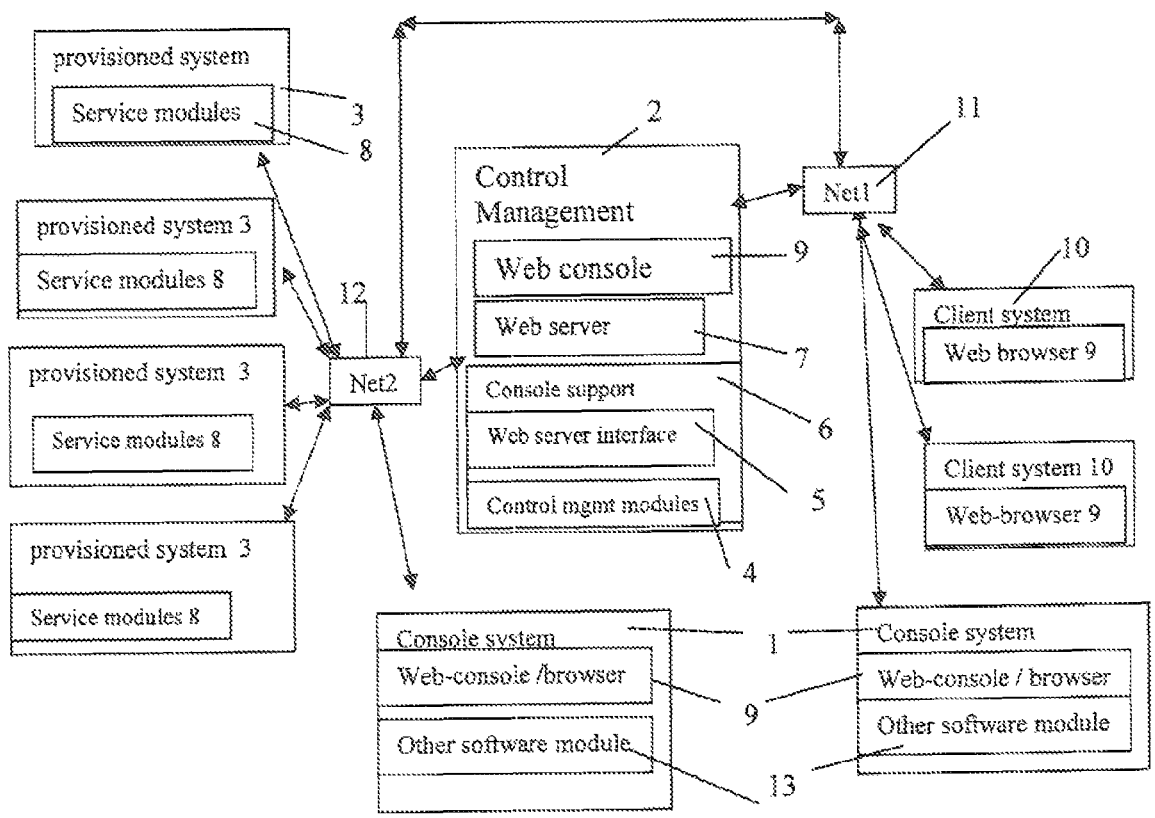
FIG. 1 is a block diagram illustrating a layout of a CCDSVM with a central control management system and multiple provisioned systems, client system and console system in accordance with one embodiment of the present invention.

The present invention can be implemented by a web based system operated in a network infrastructure, such as a central controlled distributed scalable virtual machine ("CCDSVM"). FIG. 1 illustrates a CCDSVM in accordance with an embodiment of the present invention. A CCDSVM includes one or more groups of provisioned systems 3 that automatically forms one or more service groups/pools, a control management system 2, console systems 1, and client systems 10. Control management system ("control system") 2 is configured to control one or more groups of systems ("provisioned system") 3. Console systems ("console systems") 2 provide management while client systems 10 ("client systems") initiate accessing provisioned systems 3 and control system 2 via a web-browser over a network infrastructure, such as the Intranet, an Internet, and/or a LAN.

The network infrastructure ("network") includes all necessary hardware and software resources that facilitate various users from different geographic locations to communicate through the Internet, an Intranet, and/or a LAN. The hardware of the network includes network connection media, wireless media, circuitry components, and communication equipments. The network connection media includes various cables such as Ethernet and/or optical fiber. The wireless media is capable of establishing wireless communication links through air. The circuitry components include processor, data bus, memory devices, and/or circuit board. The communication equipments, such as switches, routers, gateways, and/or adapters, are used to provide a communications network. It should be noted that there are other possible elements of communication equipment that may be needed to form a communication link, but they are not necessary to understand the present invention.

The network of the CCDSVM provides the scalable bandwidth and computational powers for CCDSVM. In one embodiment, one or more switches and routers can be added and removed for the network of the CCDSVM for dynamically connecting and adding removing one or more provisioned system units for the service pools/groups of the CCDSVM in response to the service and bandwidth and capacity requirements in providing services to meet the demand from more users on the client systems.

The software infrastructure includes Internet Protocol ("IP") addresses and system name identification software such as Domain Name System ("DNS"), firewall software, IP gateway set-up software, IP broadcast, and so forth without limit. The communication protocols over the network could be IP-based standard or non-standard proprietary protocols such as Hypertext Transfer Protocol ("HTTP/HTTPS") over Transmission Control Protocol/Internet Protocol ("TCP/IP") or Simple Object Access Protocol ("SOAP") over TCP/IP. It should be further noted that some IP based protocols are proprietary protocols and some are non-IP based protocols.

A web-browser is an application program that allows a user to access information over the Web, such as Windows Internet Explorer ("IE"), FireFox, Netscape, and/or Mozillar. A web-browser could also be any proprietary software, which uses web-protocols such as HTTP, WAP, SOAP for communication with web server over the network. The web-browser can be implemented with any or a combination of suitable programming languages such as C, C++, Java, or XML. In another embodiment, the web browser can be replaced with another networked user interface tool/application, which can be implemented using non web based specialized protocols.

A web page, on the other hand, is a displayable for information resource that is accessible through web-browser. In present invention, the web pages are being used for display the user interface part of the WCUWE for users from each of own web browser performing interactive tasks. The web pages may be hosted by a web server via a web server system and can be transmitted (or retrieved) by a web-browser. The web-page can be implemented with any or a combination of suitable programming languages such as C, C++, Java, or HTML, XML, WML and so forth without limit.

Provisioned systems 3, client systems 10, console systems 1, and control management system 2 are computational systems, which could be server system, such as database server, web server, email server, video server, file server, storage server such as NAS or SAN or security monitoring devices with video and audio recording and playback devices, or desktop or laptop system, handheld wireless devices such as PDA, wireless phone, and so forth without limit. The computational systems include hardware resource of electronic components or devices such as CPUs, storage devices, input/output and display components and memory controller. The storage devices include internal memory such as read-only memory ("ROM") and/or random access memory ("RAM"). The storage devices may further include external storage devices such as magnetic disks or tapes, which include redundant array of inexpensive disk drives ("RAID"), just bunch of disk drive ("JBOD") and memory stick. The associated storage controller can be Integrated Drive Electronics ("IDE"), Small Computer System Interface ("SCSI"), Fiber optical controller, or a combination of above-mentioned devices without limitation.

The computational systems also include non-embedded or real-time embedded OS running, which could be Linux, or Windows, Unix, or proprietary OS. It should be noted that the present invention may include multiple control systems at different layers of system configuration topology wherein each of the control systems is capable of communicating with each other through a network. The control systems at middle layers play dual roles as both control system and provisioned system in the system configuration topology.

FIG. 1 illustrates a CCDSVM platform with multiple clients in accordance with one embodiment of the present invention. The CCDSVM includes console systems 1, control management system 2, provisioned systems 3, and networks 11-12, wherein networks 11-12 are used inter-connecting with all systems of CCDSVM and client systems 10.

Console system 1 is a computational system having a web-browser or web-console 9 wherein web-browser is used by privileged users for accessing the CCDSVM platform. The web browser 9, which could be on any system, permits a user to access information from the CCDSVM by following a web URL link In one embodiment. For example, a privileged user enters a URL of "https://69.107.28.123/stt/sttwebos" on a command line of web browser 9 and once the link is established, the user can obtain information hosted by the web-based computer user work/operation environment ("WCUWE"). Console system 1, in one embodiment, further includes software modules 13, wherein modules 13 may be used to facilitate communication between console system 1 and control management system 2.

To support non web based networked user interface, the console system 1 can have a specialized software modules 13 using protocols other than mentioned web protocols. In another embodiment, if the control system 2 support a non-web based network computer user work environment ("NCUWE"), a user from a program on user's native system, which can be provided by the other software modules 13 of the console system 1, can send a similar request to the control system 2 to indicate accessing a desired networked program of the NCUWE on the control system 2.

Control system 2, in one embodiment, is a server system, a desktop or a laptop system or even a wireless devices with respective memory and storage capabilities. Control system 2 includes web server software 7 and console supporting software 6. Console supporting software 6 includes web server interface software modules 5 and control management software modules 4. The control management system 2 may also have web-browser 9 used as a web-console 9 of control system 2. Web server software 7 sends/receives data to/from web-console 9 of console system 1 or client system 10 or control system 2. Web server software 7 is configured to provide secure sockets layer ("SSL") encryption to encrypting the data before transmission to enhance the security. Web server software 7 could be commercially available software such as Apache™ from open source, or IIS from Microsoft or a proprietary software. Web server software modules and console support software modules can be implemented by any suitable or a combination of any suitable programming languages such as C, C++, Java, JavaScript, HTML, or XML.

Console supporting software 6 communicates with service software modules 8 of provisioned systems 3. Web server interface 5 of console support software 6 is capable of providing special functions that are otherwise performed by web server 7. If no provisioned system 3 is coupled to the CCDSVM platform, control management system 2, in one embodiment, is reconfigured to continue monitoring systems over the network while the CCDSVM platform is also reconfigured to a single stand-alone system, as shown in FIG. 2B. Users can access and/or obtain objects or system resources information via web-browser 9, which can be resided at any client system 10 or console system 1 or control management system 2.

Provisioned system 3, in one embodiment, is a computational system, wherein the system may contain suitable operating system ("OS"). Provisioned systems 3 can be automatically provisioned by control system 2 through a variation of the automatic system service pool construction protocol, which is a proprietary combined sequence of TCP/UDP/IP protocols as described in prior said application entitled "Method and Apparatus for Web-based Storage On Demand" and to form one or more service pools (system groups) based on group ID. Provision process, also known as pooling process, is a method allowing control system 2 to control one or more network systems by reconfiguring the network systems. For example, when a provisioned system boots up via a communication protocol, control system 2 detects and obtains provisioned system's name, IP address, and system information wherein the system information includes network information, service group ID, storage information, file system information and so forth without limit, and further stores these information into a provisioned system unit information lists in a database on the control system 2.

Each provisioned system 3 can be monitored, accessed, and/or operated by a user(s) through said web-browser 9 after the provisioning process. The control system 2 also updates status of provisioned system unit in the service pool in response to detect the shutdown or link down of any provisioned system and in response to admin staff's maintenance requests for removing any provisioned systems from service pools.

In an alternative embodiment, provisional system 3 is controlled by users through client systems 10 or console system 1 via control system 2 with proper users' authentication. Each provisioned system 3 contains service software modules 8, which is used to communicate with control system 2, console system 1 and client system 10. For example, service software modules 8 of provisioned system 3 can communicate with control management software 4 to carry out tasks for monitoring, accessing or managing resources of provisioned system 3. Service software 8 can communicate with web-browser 9 of client system 10 or console system 1 or control t system 2 to transfer data between them or deliver service to them, or to communicate with another provisioned system 3 to send or receive data.

In one embodiment, the CCDSVM provides the service software modules 8 to includes the functionalities of the console support software 6 and web server software 7 of the control system 2 to form the WCUWE of the provisioned system. Therefore, when a user login to the control system for access the CCDSVM, the user also can access the permitted WCUWE of the provisioned system 3 via a displayed entry point of the user's private workspace in the user's web browser. Further, each provisioned system 3 is able to provide data and application services for one or more client systems independent of other provisioned system 3 and without going through the control system 2 again.

In one embodiment, one or more spare provisioned systems 3 can be provided, where each spare system 3 is configured with identical service applications and data as one or more corresponding provisioned system 3 configured in each service pool, for providing fault handling. Once the control system 2 detecting a faulted provisioned system 3, it can immediately instruct a corresponding spare provisioned system 3 to provide the service replacement for the faulted provisioned system 3 to provide continued service for one or more clients. In addition, using spare system has certain advantage, for example, one spare system 3 can serve one or more provisioned systems 3.

Service software modules 8 may include special software modules having compatible functionalities of web-server software 7 of control system 2 and to dedicate handling HTTP/HTTPS protocol or other web protocols if there is needs for web-based communication with client 10 or with other provisioned system 3 or with control system 2. In another embodiment, the service software modules can be implemented to communicate with non web browser based networked user interface by deploying specialized network protocols such as non-web based TCP/UDP/IP protocols. Software modules 8 could include commercially available web server software 7 or any proprietary software. The service software modules 8 could be implemented with any or combination of suitable programming languages such as C, C++, Java, or JavaScript.

Net 11 and Net 12 are network infrastructures of the CCDSVM that are capable of providing communication links between control management system 2, console system 1, client system 10, and/or provisioned systems 3. Net 11 and Net 12 comprises one or more switches and/or routers for providing scalable network, where the switches and routers can be added or removed along with adding or removing one or more provisioned systems in response to the services requirements. Client systems 10 may not be a part of CCDSVM, but with the permission and authorization, one or more users from web-browser 9 of client system 10 can login to CCDSVM and access the permitted resources of CCDSVM using web-browser 9 by following a web URL link of CCDSVM. To support non web based network user interface, the client system 10 can have a specialized software same as the software modules 13 of the console system 1. While privileged users can obtain, manage, access, and/or operate system resources from CCDSVM through WCUWE, regular (non-privileged) users at client systems 10 may be permitted to access only limited system resources of CCDSVM. The prior applications entitled "Concurrent Web Based Multi-Task Support for Control Management System," and entitled "Display multi-layers list item in web browser with supporting of concurrent multi-users" together have described how to setup user security profile for one or more users interactively selects and accesses permitted resources and performs various permitted tasks via one or more displayed permitted folder-trees/MLIL.

CCDSVM configuration, in one embodiment, includes four data flow paths. The first data path is a communication link between web browser 9 of client host 10 (or console host 1 or control management system 2) and web handling software on control system 2 (such as web-server 7 and console support software 6). With this path of data flow, whenever a user sends a request from web-browser 9 to web-server 7 and further to console support software 6, console support software 6 collects required information from target systems and converts (encode) them into standard structured information (web-format/web-page) for web communication by using any or a combination of suitable programming language such as C, C++, Java, Javascript, HTML, XML, WML and so forth without limit. The targeted system could be one of provisioned systems 3 or control system 2.

The information collected by the console support software 6 of control system 2 could be, in one embodiment, the system status, storage information, network information, user authentication profile, the file system information, files & folders information on control system 2, or any targeted provisioned system 3. Console support software 6 then passes this converted structured information (web page) to web server software 7 and further transmits to web-browser 9 through communication link Net 11 and Net 12 so that it can be displayed and viewed by a conventional web browser 9, as shown in FIG. 1.

The communication protocol used between the web-browser 9 of client system 10 (or console system 1 or control system 2) and the web server 7 of control system 2 could be HTTP, HTTPS (SSL encrypted HTTP protocol) or any suitable web protocols for web communication, which could successfully transmit the data on the web or could be other standard or proprietary IP-based on non-IP-based protocols. This data path may be simply referred to as the console support software 6 transferring data to/from said web-browser 9.

In one embodiment, if the control system 2 is configured with multiple network interface equipments, the console support software 6 detects from which network interface the requested data stream submitted by web browser 9 is coming from, therefore, it will provide the response web page back to the web browser 9 via the same communication link that includes the identified network interface equipment.

The second data path is the data flow through communication link between control system 2 and provisioned systems 3. Requests targeted to a provisioned system 3 are passed from the console support software 6 of the control system 2 to the service modules 8 of the provisioned systems 3 through the communication link network 12. When the requests are received by a provisioned system 3, the service modules 8 of provisioned system 3 carry out the requested tasks, and if there is needs, the service software 8 of provisioned system 3 then send the response back to console support software 6 of control system 2, and further let control system to provide response back to the user's request. In another embodiment, the service software modules 8 of the provisioned system 3 provide response back to the user directly without going through the control system again.

The implementation of the actual products of this invention on the second data path may use proprietary TCP/UDP/IP based protocols for the communication between provisioned systems 3 and control system 2. However, other standards or proprietary IP-based or any suitable non-IP-based protocol are also possible. The communication protocols used between console support software 6 of the control system 2 and service modules 8 of provisioned system 3 can be any suitable IP based or non-IP based protocols, whichever is suitable to transmit data between them. The typical data flow through this path could be the boot message, system status, network information, or storage information of provisioned system 3, and so forth without limit as shown in FIG. 1.

The third data path is the data flow between provisioned systems 3 and client system 10 or console system 1 via communication link 11-12. Referring back to FIG. 1, in one embodiment, the console support software 6 of the control system 2 may present a web link, which points to an object on a provisioned system 3, to be displayed in web-browser 9 of client system 10 or console system 1 or control system 2. The object pointed by the web link on the provisioned system 3 could be a text file, MPEG video, digital picture, PDF document, MS Power Point, Word documentation, etc. without limit. It also could be a link of another web service program. From web browser 9, a user can directly access the information on a provisioned system 3 pointed by the web link without go through the control system 2 again. In this case, service modules 8 of provisioned system 3 also include web server software modules or equivalent one to directly support web browser 9 as mentioned before. The communication protocols with the third path could be web protocols such as HTTP or WAP. Alternatively, the communication protocols can be other standards or proprietary IP-based or non-IP-based protocols. To simplify the discussion, the data transmitted on this path will be mentioned as service software module 8 that send data to or receive data from said web-browser 9 or vice versa.

The fourth data path is data flow through communication link between provisioned system 3 and another provisioned system 3. With this path, service modules 8 of one provisioned system 3 can directly transmit data or information to service modules 8 of another provisioned system 3 via a communication link Net 12 without going through control system 2. The implementation of the actual products of this invention, for example, uses a proprietary IP-based protocol for communications between the two provisioned systems 3.

The principle of this invention, however, does not rely on or limit to proprietary protocol. It should be noted that other standard or proprietary IP-based or any suitable non-IP-based protocol may also be possible. The data and information transmitted through the fourth data path can be various types of data. For example, a user on web-browser 9 may open a file folder on a provisioned system 3. Further, the user can also instruct to select and transfer any file or file-folder from a current target provisioned system 3 to another provisioned system 3 by an interactive click mechanism. The data file or file-folder will then be transferred directly between the two provisioned systems 3 without going through control system 2.

Figure 2A:
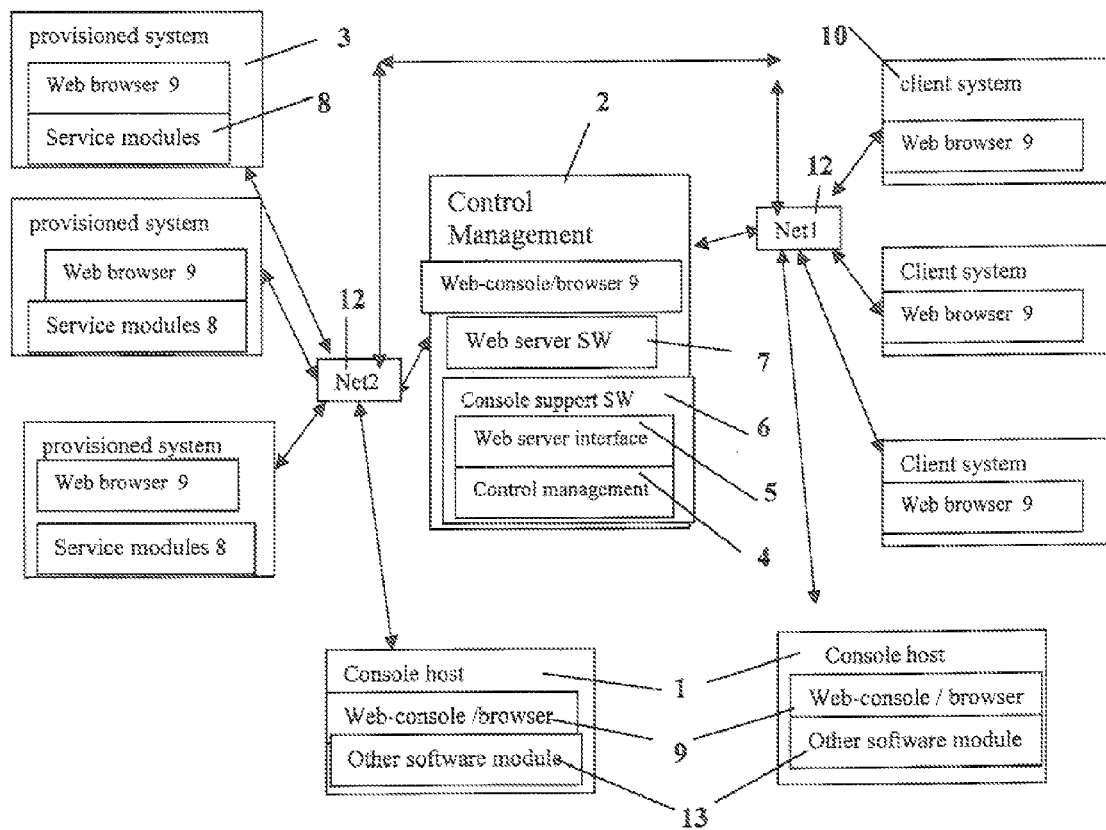
FIG. 2A is a block diagram illustrating a layout of a CCDSVM with which users from their web-browser of provisioned system can communicate with each other in accordance with another embodiment of the present invention.
Figure 2B:
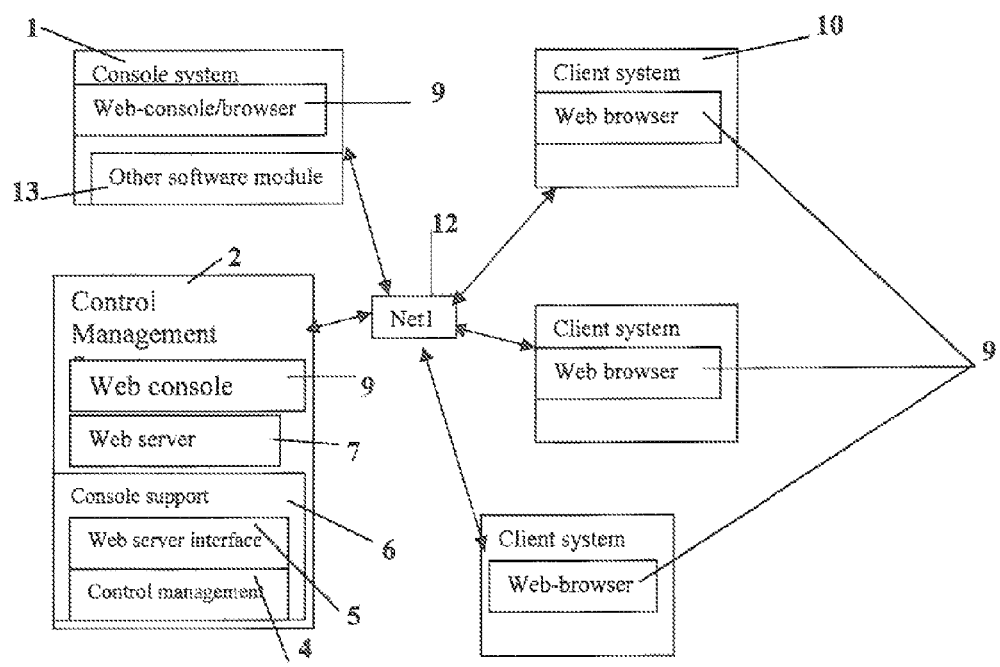
FIG. 2B is a block diagram illustrating a layout of a CCS-DVM with only a single control management system to be accessed by massive client systems in accordance with another embodiment of the present invention.

FIG. 2A illustrates a variation of CCDSVM platform for web browser-based communication in accordance with one embodiment of the present invention. CCDSVM platform illustrated in FIG. 2A is similar to the platform illustrated in FIG. 1 except every provisioned systems 3 includes a web-browser 9. Also, the client system 10 can have same software modules 13 as console system 1 has. Thus, with proper authentication process, each user of provisioned systems 3 may access, manage their own provisioned system 3 from web-browser 9 either on their own local provisioned system 3 or on any client system anywhere on the network. It should be noted that when a user is registered with a provisioned system 3, the user is authorized to access provisioned system 3 locally but not with CCDSVM. On the other hand, when a user is registered with CCDSVM, the user is not only can access its own local provisioned system 3 but also can be authorized to access multiple provisioned systems 3 and control system 2 of CCSDVM.

FIG. 2B illustrates another example of a variation of CCDSVM, in which there is no provisioned systems 3 in CCDSVM. Control system 2 can run on its own and CCDSVM has degenerated into a single stand-alone system (FIG. 2B). The users through web-browser 9 on any client system 3 (or on console system 1, or on stand-alone control system 2) are allowed to access and manage the stand-alone control system 2 via the WCUWE of the standalone control system 2.

Unless specifically specified, the console support software modules 6 of control system 2, the provisioned systems 3, the service software modules 8 of the provisioned system 3, and the web-browser 9 of the control system 2, client system 10, and console system 1 are referred to the CCDSVM platform illustrated in FIG. 1.

Figure 3:
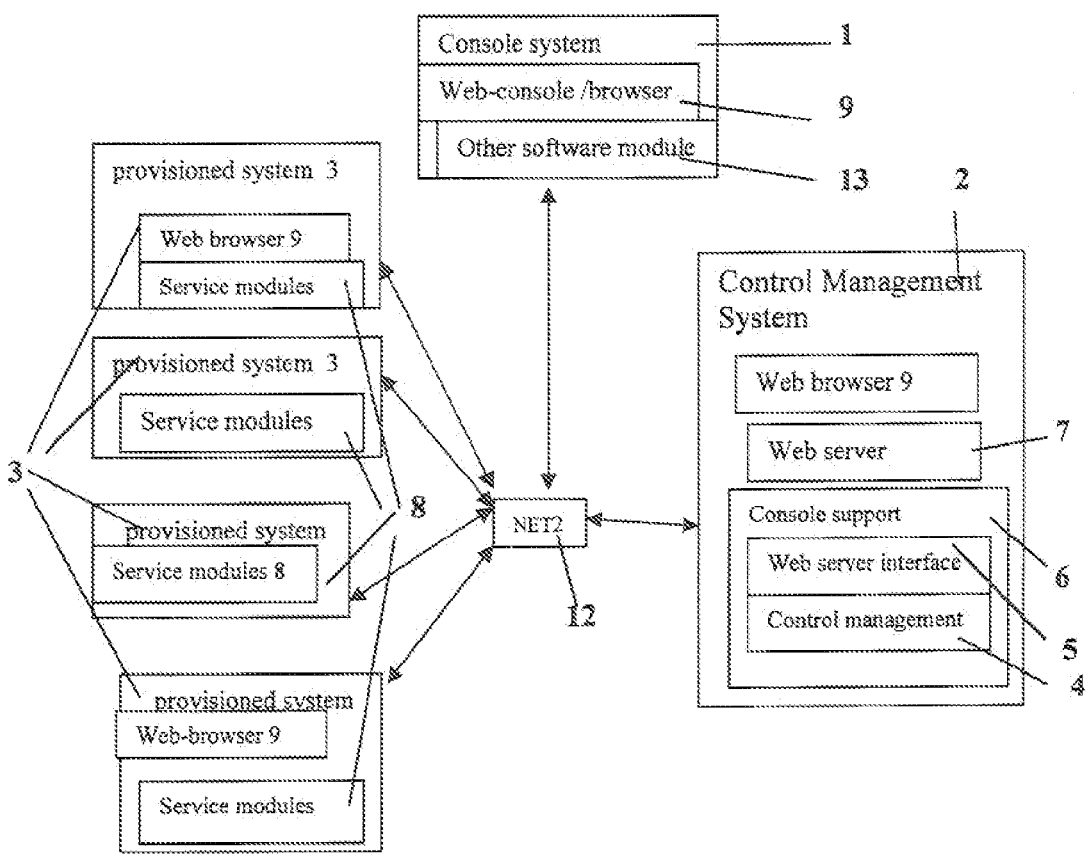
FIG. 3 is a block diagram illustrating an example of a software for a CCDSVM in accordance with one embodiment of the present invention.

A web-based computer user work/operation environment ("WCUWE") of CCDSVM is provided by a software infrastructure, shown in FIG. 3. The WCUWE provides each permitted user to log into CCDSVM and further provide each login user a private web-browser based operating environment, which is a private workspace including one or more assigned and permitted resources on the control system 2 or provisioned systems 3 on the network.

In one embodiment, the user private workspace can be initially assigned and displayed in web browser with limited resources such as an entry point of the user's top level home directory for managing one or more next levels of file-folders and their files, an entry point for update user's password or managing one or more user's authentication, an entry point for accessing networking, and entry point for monitoring and managing hardware devices including storage devices, an entry point for joining 1-to-1 personal communication and an entry point for joining group collaboration including accessing on-the-fly streaming video provided from other user's digital camera or archived streaming videos for the meeting, and so forth without limits. The user private workspace can be encoded into web page and displayed into user's web browser upon user's login to the control system for accessing the CCDSVM with any suitable or a combination of suitable programming languages.

In another embodiment, the owner (assigned user) can dynamically managing resources in the private workspace such as create a new file under a file-folder by using editing or other proper application tools, delete one or more files or file folders, copy or move files or file-folders from a source file-folder either on the control system 2 or on any provisioned system 3 in CCDSVM into the user's permitted file-folders/directories of the CCDSVM, or upload files from user's native system's local drives into any user's permitted file-folder/directory, or transmit files or file-folders from user's native system's local drives into the user's default home file-folder/directory structure via a specialized file and file-folder transfer mechanism.

In one more embodiment, the user's private workspace in the CCDSVM displayed in web browser also can be connected to the user's local file-folder/storage drives on the user's native system via the communication between the console support software modules 6 and the service software modules 8 on the user's native system as depicted in FIG. 2b. Therefore, the file-folders on storage drivers of a user's native system can be displayed and be accessed via the user's private workspace of the CCDSVM.

WCUWE further provides each user from a single web-browser 9 to interactively perform various permitted tasks and operations over various system resources (FIG. 5), wherein the tasks can be performed concurrently from a single web-browser 9. The tasks include user authentication management such as allowing privileged users to create users, groups, assign users to each group, to assign initial resources to each user or group, and to save the information of created users and groups into a database stored on a storage media of the control system.

The information of users or groups include user names, user IDs, assigned security permissions, passwords, access points, group names, group IDs, maximum members in a group, and so forth. The assigned security permissions include the user's role and credential information, which further includes from where the user can access CCDSVM, what service group/pool the user can access, what system and what specific resources on a system the user can access, and what task the user can perform. The user's security permission is encoded into a security data structure, where one or more fields of the security data structure containing one or more bits with bit-status of on or off to represent the status of one or more specific credential or permission for the user.

The privileged user can dynamically grant or revoke other user's security permission and credential via interrogating each user's security profile by inspecting, checking, and changing the status of each security permission field, or assign and deny each specific user to access the resources of the CCDSVM via set access control option from operation menu associated with any resource.

In addition, the console support software 6 of the control system 2 keeps tracking records for each user's every login session including the time of login and the time of log out, at what time performed what task or accessed what data or applications. In one embodiment, the console support software modules 6 receives and parses each user's accessing request, and writes information of each user's request into a access record in the per user secure access file, which can be linked to each user's security profile for real-time fast interrogation. In one embodiment, the per user secure access record file can be backup by copying it to another file with a special name tag, and it can further be emptied on a periodic bases for keeping the up to date user's access records.

The tasks also include personal or group communication, system and network management, accessing and managing data, service, and hardware resources including network and storage device, file system, file-folders, files, messages, user security, and so forth without limits. Many of tasks has been described in said prior applications of "Concurrent Web Based Multi-Task Support for Control Management System," and "Display multi-layers item list in web browser with supporting of concurrent multi-users".

After receiving each task information transmitted from the web browser 9, the console support software 6 of control system 2 parses and stores each task information into an available entry in an user space task list. After completing said task to be executed on targeted system, the corresponding entry stored with said task on the user space task list is cleared up. In addition, the console support software 6 of control system 2 immediately provides a response web page to each web browser in response to each submitted task independent of the completion of the task execution.

In one embodiment, said response updates the original web page in said web browser to be encoded with the status of the task including the task result if the task is successfully completed or include the task execution status if the task is failed or in progress or include a location that said task result will be deposited. Additionally, the WCUWE deploys a lock protecting mechanism for said user space task list and all resources related to each task's execution in the event that multiple tasks may concurrently access and change the state of each mentioned resource.

The WCUWE of the CCDSVM includes software modules of present invention. For example, the software includes console support modules 6 of control system 2, which further includes web interface/client interface modules 5 for receiving requests from end users' web browser either on the control system or remote system, and includes distribution control management software modules 4 for control, monitor, and manage the provisioned system units 3. The distributing control management modules also controls user authentication, fault detecting and recovering, contents distributing, and tasks distributing and executing.

The software also includes the service software modules 8 of provisioned system 3, other service software 13 of console system 1, which can be used for send or receive data to/from the control system 2 and provisioned system 3 using non web-based protocols without web browser's involvement. The current implementation of WCUWE is based on a proprietary design of this invention. However, the nature and spirit of this invention does not limit to proprietary designed software. The WCUWE of CCDSVM also includes other proprietary software modules or conventional software such as web-server 7 of control system 2, web-browser 9 of the control system 2, the client system 10, and console system 1.

The WCUWE of the CCDSVM can be implemented with any suitable or a combination of various suitable programming languages such C, C++, Java, JavaScripts, HTML, XML, and so on. To simplify the discussion, the WCUWE will be used to represent software modules in CCDSVM described above.

Users of CCDSVM may be created by CCDSVM though a given process or any users on the Internet, Intranet, LAN without registering with CCDSVM. The WCUWE of CCDSVM provides user to access various resources and perform various tasks through a preferred model of clicking on graphic or text represented resource objects on browser.

WCUWE is designed to be operated on a CCDSVM platform, and specially is designed to provide dynamic workspace (FIG. 4A) to each user associated with various CCDSVM as depictured in FIG. 1, FIG. 2A and FIG. 2B. WCUWE further facilitates each user to performs tasks for instantly posting a resource information to or un-posting/withdrawing user's previously posted resources information for web page's contents in a group model or in 1-to-1 model for users of CCDSVM in a same group or without group membership, or for massive public online users over the network, wherein said public users from each of own web browser do not have accounts with the CCDSVM and can access the public resources provided by the CCDSVM via public web pages.

The dynamic workspace of WCUWE is a centrally controlled collection of each group's workspace and/or user's private workspace. Console support software 6 of control system 2 of CCDSVM will assign each user a private workspace and each group a common workspace when each user or group account is created by a privileged user after the WCUWE of the CCDSVM enters into an operational mode, wherein a first privileged user is created during installing said software of CCDSVM. When a user or a group account is created, each user is assigned to a specific user security credential and permission and permitted resources based on each user's role. For example, some users are privileged user who can perform system administration tasks and others are general users who can be permitted to access certain types of applications and resources of the CCDSVM.

A workspace is an organized information structure, which can be saved on storage media including memory or disk drives or both of memory and disk drives by console support software 6. A workspace is created during a privileged user performing the tasks of creating user or group. The workspace will be initiated and assigned with limited resources of CCDSVM such as shown in FIG. 5. Various resources on either provisioned system 3 and/or on the control system 2 include respective memory, system-groups, systems in system-group, file system, file-folder, files, storage media, network media and so on without limits. The common workspace 15, shown in FIG. 4A and FIG. 4B, of each group may be initially assigned with resources information (FIG. 5) including users in this group, message area, file systems, file-folders and files on a specific provisioned system 3 or on control system 2, and so on. The resources information of the common workspace may also be dynamically assigned or allocated by permitted user after creating group account. For example, during an online interactive meeting, a user posts a file information to the common workspace, so that a new entry of a file node is added to a file and a folder tree area of common workspace.

Figure 4A:
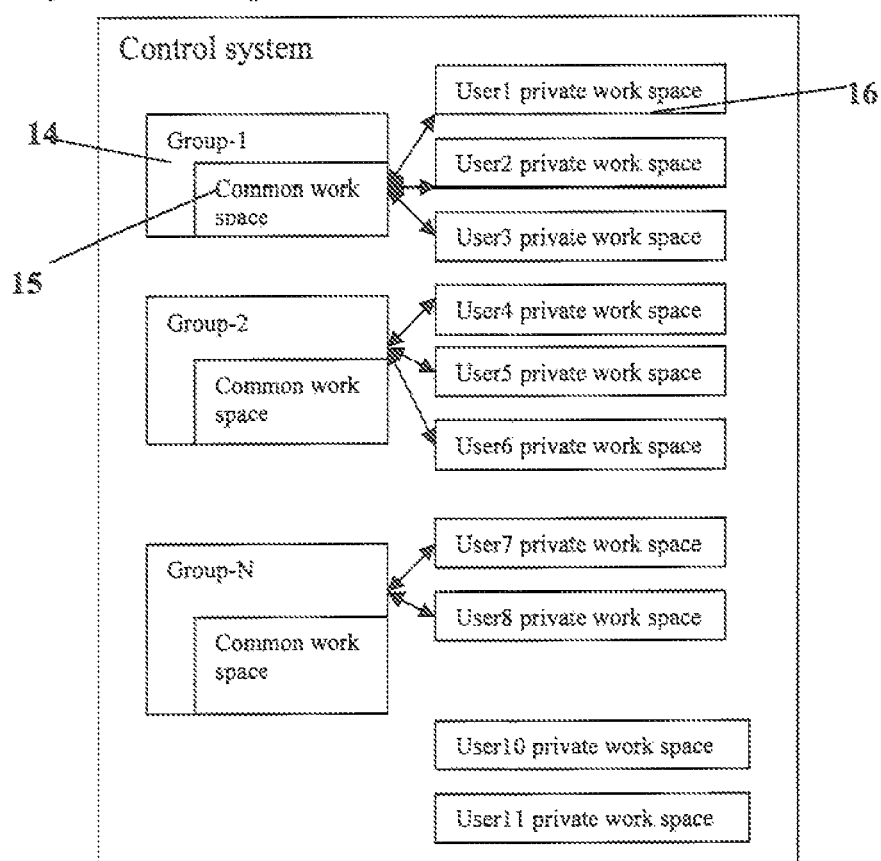
FIG. 4A illustrates an example of a dynamic workspace in accordance with one embodiment of the present invention.
Figure 4B:
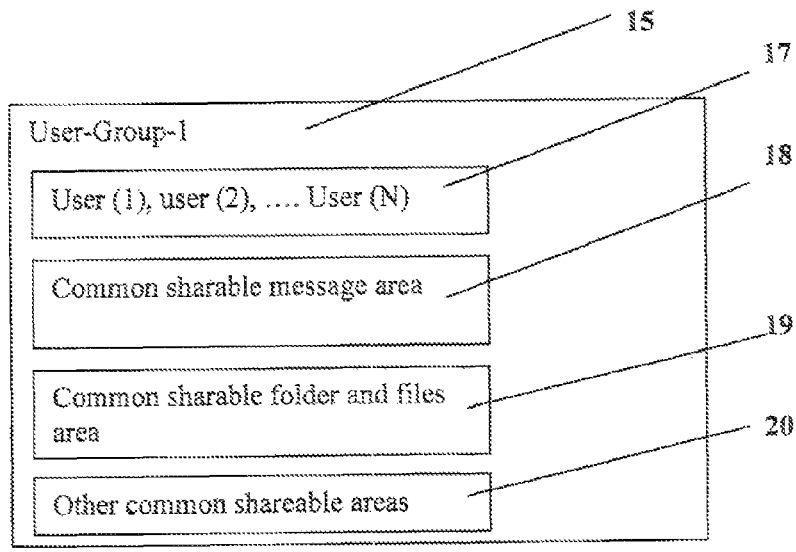
FIG. 4B illustrates an example of possible resources which may be assigned to a user-group common workspace in accordance with one embodiment of the present invention.
Figure 4C:
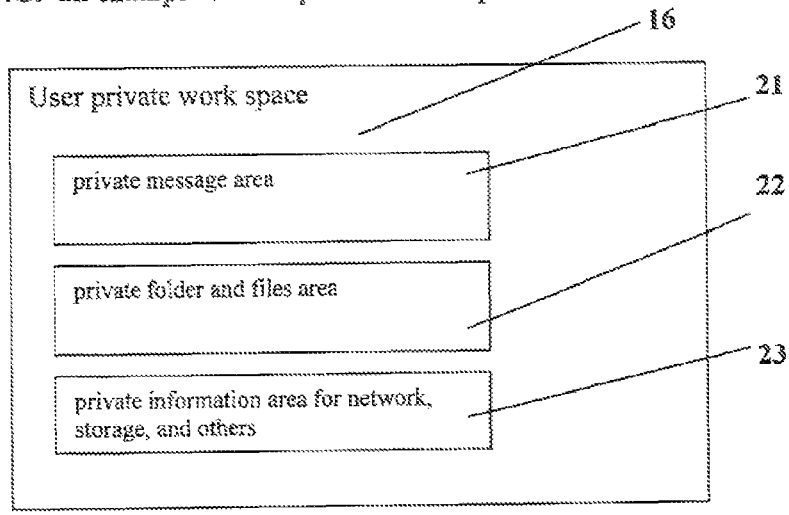
FIG. 4C illustrates an example of a user private workspace and possible assigned system resources in accordance with one embodiment of the present invention. The mentioned managing resources can be realized via operation menu associated with displayed resource information. For example, a file-folder can be associated with an operation menu containing an operating option of creating a file, which encoded into a web page and to be displayed in user's web browser on his/her native system. Upon the user to select and submit the task of creating a file, an editor can be invoked and displayed in user's web browser or in a separate displayed area, so that user can input the content of the new file and further save it via a save new file operating option to transmit the created file back to his/her default home file-folder/directory.
Figure 5:
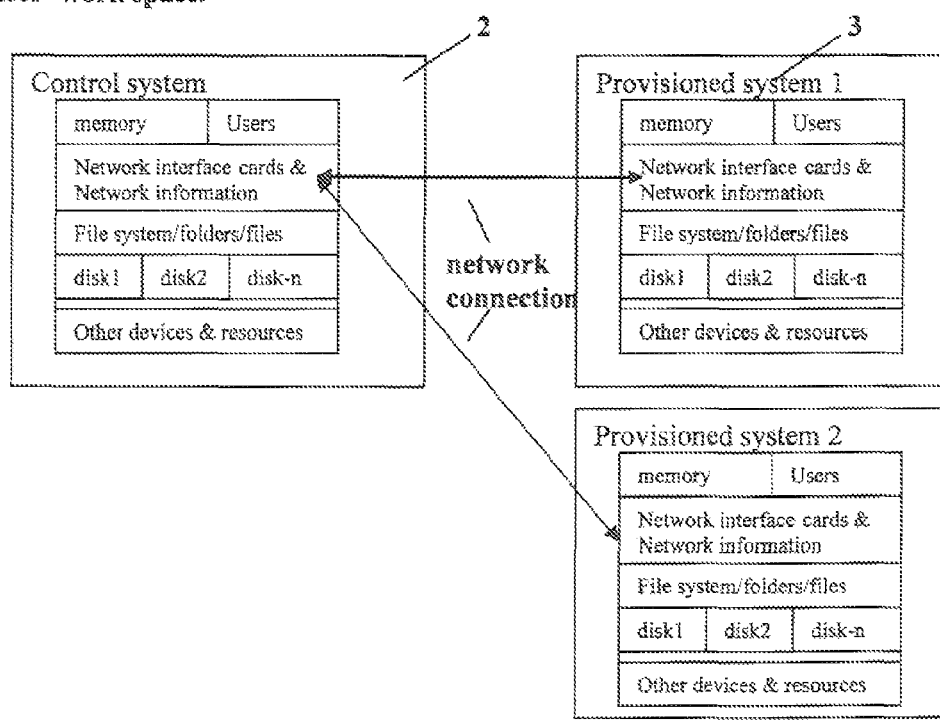
FIG. 5 illustrates an example of resource objects on systems of CCDSVM in accordance with one embodiment of the present invention. The resource information can be network resource such as the identification information of one or more provisioned systems, which controlled and grouped by the control system if said control system is not an standalone system; wherein said identification information of provisioned system includes system name, IP address, ID such as system service group ID.

In addition, each group may be assigned to one or multiple users, wherein each user can also be assigned with a private workspace 16 of FIG. 4A and FIG. 4C during user account creation time. Also, one or more users also can be dynamically removed from a specific group depends on the needs. The private workspace may also be initially assigned by resources information of the CCDSVM during user account creation time. Thereafter, the private workspace is dynamically assigned with the resources of CCDSVM after user login CCDSVM.

After creating user and group accounts information, the privileged user can dynamically grant or revoke the permission for a general user to access one or more mentioned resource from his/her private workspace. In one embodiment, the privileged user can select a node containing a list of storage device on a hardware resource folder-tree of the CCDSVM, and further to select posting option from operation menu and input a targeted user information for binding the list of storage device on a system of the CCDSVM to a user's account or select a withdrawing option to remove the list of storage devices from user account profile. Therefore, during the operation, at one second, the targeted user may see said list from user's web-browser, and at another second, a general user will no longer see the list, which was in the user's displayed private workspace in web browser. Also, if an authorized user can access a list of storage devices on a provisioned system and further can take one of devices offline so that the device list on the provisioned system will have one less devices to be displayed in the user's web browser.

In another example, at one second, a privileged user grants a general user to access a file J in folder N on system M of CCDSVM by selecting the file J and selecting an set access control option from the web operation menu to submit task of set access control for said user, and at another second, the privileged user with similar steps to resets previous permission, thereby, the general user can view and access the file J in folder N on system M of CCDSVM at one time, and a second later, the general user will not be able to view and access it. The actual implementation of console support software 6 of control system 2 has achieved this capability.

The total number of users and user groups can be created is dependent on the capacity of the control system such as how larger the memory and storage capacity are on the control system. For example, if a user private workspace requires 1 Gig-bytes in storage space and 2 Meg-bytes in memory space, a system with 1-GB memory and 500 GB storage roughly can support 500 users. Similarly, the number of the concurrent users access CCDSVM over the network with a certain data rate also is bound by the network bandwidth that CCDSVM infrastructure can provided.

When a user account is deleted, the private workspace and user' membership with a group are automatically removed and updated. On the other hand, when a user group is deleted the group common workspace is deleted, along with removing the group membership encoded in each associated user's security profile without effecting the rest of user's private workspace. In another embodiment, when a different type of user group is deleted, all accounts of the associated users and their each of the private workspace in the group are deleted together with the deleting of the group account.

In addition, one or more types of resources in the workspace can be organized as one or more list of tables and can be stored in storage media of the control system as database. The integrity of security of each group is protected by limiting different resources to different group. As such, each group is authorized to have a limited view over assigned system resources on provisioned systems 3 as well as control system 2. The same security integrity at user level can be achieved by assigning different system resources of provisioned systems 3 and/or control system 2 to different individual user based on exclusively assigned security permission and credentials. Therefore, each user is authorized to access and view the assigned resources.

FIG. 4B has shown an example of assigned resources information of a group common workspace 15 including users area 17, message area 18, and folders and files area 19, and others 20 in common workspace 15 of a group. All resource information in the group common workspace can be shared by all users in a same user-group. All resources in each group's common workspace can be selectively displayed in web-browser of each login user, who belongs to same user group after said resources information in said group being converted to presentable web-format (web-page) by the console support software 6 of control system 2 of CCDSVM.

FIG. 4C has shown an example of resources in private workspace (16) of a user, which has assigned private message area 21, private file, folder area 22, and private network or storage or other information area 23. The assigned resources only can be exclusively viewed and accessed by the designated user unless he/she agrees to share with peer user crossing group boundary or with peer user in same group. The directory is a data structure which can hold one more files and file-folders at logical file system level and be stored on physical storage media.

FIG. 8A has shown an example of displaying an actually implemented portion of web-page encoded with assigned resources information folder-tree in private workspace of user X, which includes three layers. The top layer includes a system-group-A 33 on said network, which includes its next layer of multiple provisioned systems 3. One of provisioned system 3 (system-2) includes its next layer of two private file-folders 32 and 34 of user X, and each file-folder contains its next layer of files displayed in the private workspace of user X.

FIG. 8B has shown another example of displaying an actually implemented portion of web-page encoded with assigned resources information in private workspace of user Y, which includes control system 2, private folder and files 35 of user Y in a private workspace of user Y.

The private workspace of user X and user Y may also include private message area 21 and other resources, which are not displayed in FIG. 8A & FIG. 8B because WCUWE is designed to dynamically display part of user's private workspace in response to each user's needs.

It is notable that said user X and user Y, may be in same user-group such as said group-1, however, each of them has displayed a significant different private workspace on the control system 2 due to they have been assigned with very different resources of the CCDSVM depending on each user's role and security permission, which setup by privileged user of CCDSVM through web-based user interface provided by said console support software 6. This is the beauty of the invention of WCUWE for CCDSVM.

The FIG. 6C and FIG. 6D are examples of web-page view in said web-browser 9 of user X and user Y in user-group-1 before an interactive online meeting. As shown in FIG. 6C and FIG. 6D, user X or user Y or other users (who's web-page/browser did not depicted) in same user-group-1 have entered a group online meeting after their login to CCDSVM from each browser on each of own native system over said network. Both users X and Y get an identical web-page provided by said console support software 6 of control system 2 except with different contents in displayed private workspace section of web-page due to each user has assigned with different resources. The web-page screen layout provided by said console support software 6 contains four sections:

1) a private user message input area (section-1),
2) a message displaying section for common message area 18 of FIG. 4B for all users in user-group-1 (section-2),
3) a file or folder display section for group common file and folder area 19 of FIG. 4B for all users in same user-group-1 (section-3), and
4) a file and folder tree displaying and management section (section-4) for user folder and file tree in private file and folder area 22 of FIG. 4C of a user's private workspace.

Initially, said section-1, section-2, and section-3 are all empty due to no one has post any file information or message yet. The console support software 6 gets each login user's portion of assigned folders and files for online meeting from stored private file and file-folder area 22 of FIG. 4C in private workspace of each user on said storage media, and further convert/encode said file or folder information into said section-4 of presentable web-format (web-page) to be displayable in web-browser 9 of each user. The choice of total four sections of web-page layout and the order of each section on the browser screen is irrelevant to this invention since other choices of design are also possible, and further, this invention does not have limitation on what web-screen layout shall be. The information of file or folder attributes includes the system name where the file or folder resided, the named and path of the file or folder, the owner of file or folder, the time stamps, the size of the file and so on without limitation.

During the interactive online meeting, said console support software 6 provides each user to post or un-post files or folders information to said section-3 of displayed group's common documents and contents management section with several steps. First, for example, providing said user X to click on a targeted file "Doc 1" 24 or folder one a time in section-4 of displayed said file and folder management area of said user private workspace. Second, select the operation of either post or un-post from an operation menu (see FIG. 9A, FIG. 9B, FIG. 10A and FIG. 10B). Finally click on the selected operation to submit the task of either post or un-post on selected file or folder.

Each user with permission may perform un-post operation if such user has at least a previously posted file or folder information, which has already displayed in section-3 of common document and content management section of said web-browser 9 of all login users in said same user-group, see FIG. 6A or FIG. 6B for example.

If a file is selected, said file operation menu is used and if a folder is selected, the folder operation menu is used respectively. It is also possible to only provide one menu for both file and folder operation by said console support software 6. The operation menu either can be pop-up menu for folder as shown in FIG. 9A or pop-up menu for file as shown in FIG. 9B, or non-pop-up menu for folder as shown in FIG. 10A or non-pop-up menu for file as shown in FIG. 10B, or drop-down menu or just one or more submit buttons. Each operation menu contains one or more operating options for user to select and submit corresponding task. The choice of operation menu is irrelevant to this invention although the actual implementation of this part of invention has used pop-up menu, and as matter of the facts that there is no limitation on how the operation menu is to be designed in this invention.

In the example of FIG. 6A, user X can post a file named "Doc 1" 24 to said section-3 of common document and contents display section of said web-browser 9, In the example of FIG. 6B, user Y also can post a file named "picture 1" 25 to common document and contents display section of said web-browser 9. In addition, another not depicted user Z posted a file of "project code". The files or file-folders could be one on said control system 2 or on provisioned any provisioned system 3 of CCDSVM.

In addition, during the interactive online meeting, the console support software 6 of control system 2 also provides each user to post message to one or more users in same group from said section-1 of private user message input section after typing a message and click on the "send" button. In the example of FIG. 6A, user X posted a message of "Msg1 of user X" 26. In the example of FIG. 6B, user Y also posted a message of "Msg2 of user Y" 27. In addition, another non depicted user posted a message of "Msg3 of user Z". As a result, all of three messages were displayed in the same said section-3 of each user's browser.

In a specific situation, the console support software 6 also provides permitted user to un-post the previously posted message. Just for example, in FIG. 6A, said console support software 6 provides permitted user X to select a previously posted "Msg2 of user Y" 27 from said section-2 of common message display section of said web-browser 9 of user X, and select un-post operation from said operation menu and submit the selected un-post task.

The detailed information of how the post or un-post task to be implemented will be discussed in a few paragraphs later. In addition, with this invention, the action of the "post" information such as posting information of files or folders or messages or other resources is equivalent to the action of "share" information. The action of "un-post" information is equivalent to the action of "un-share" previously posted or shared information, in other words, "remove" previously posted or shared information.

After user transmitting information data of the post or un-post task from web-browser 9 of console system 1 or client system 10 or control system 2 to control system 2, the console support software 6 of control system 2 obtains and parses the data to determine: who is the original user initiating the task; what type of task; what type of associated resources for task to work on; who is the targeted user; and what is the time stamp, and may also include other information without limitation. The console support software 6 further determines that if the task is to post a file or folder from said original user, the console support software 6 picks up the corresponding file or folder information from file and folder area 22 of FIG. 4C of private workspace of the original user and deposits such information to the file and folder area 19 of FIG. 4B of common workspace of said group in this case.

If the task is to un-post/withdrawing a previously posted file or folder, which posted from a private workspace of a specific user, in said common workspace of said group, the console support software 6 search for the corresponding information of file or folder in the file folder area of said common workspace of said group and further remove the entry of matched information from said common workspace of said group after it is found.

If the task is to post a message to users in said group, the parsed message will be stored in private message area 21 of FIG. 4C of original user's private workspace 16 of FIGS. 4A and 4C and parsed message also is copied to message area 18 of FIG. 4B of common workspace 15 of FIGS. 4A and 4B of said user-group by said console support software 6.

If a task is to un-post (delete/remove) a previously posted message, the console support software 6 searches for a matching message in said common message area 18 of FIG. 4B of said common workspace of said group and remove such message entry if it is found based on message and original user identification and other associated information such as time stamp, security permission and so on without limitation.

It shall be noticed that the task of un-posting a file or folder of this invention does not actually delete the original file and folder from original user's private workspace. In addition, a lock protection mechanism is deployed whenever a message or information of a file or folder is written, stored, or deposited to either said private space or said common workspace, or to said disk drives or other storage media. Throughout the rest of discuss, the lock protection is assume to be a default action without further mentioning whenever a write/store/deposit action take place. As matter the fact, each task of posting file, folder, and message as well as task of un-posting the previously posted file or folder, or message performed by multiple users in multiple groups with this invention can be executed by the console support software 6 instantly with memory speed.

FIG. 6A and FIG. 6B illustrate that after console support software 6 of control system 2 successfully executing the tasks for each user in each group, any user in a said user-group can get a fresh view of said section-2 of the common messages display area of user-group-1, and a fresh view of said section-3 of the common documents & contents display area of user-group-1 from each user's said web-browser 9 on client system 10 of FIG. 1 or on control system 2 of FIG. 1 or on console system 1 of FIG. 1.

User can manually click on a refresh-button, which does not show on FIG. 6A and FIG. 6B, to refresh entire web page screen including corresponding part of screen of either said section-2 or section-3. Also the corresponding part of browser screen of said section-2 or section-3 can be automatically refreshed. As mater of the fact, optionally, the console support software 6 can provide a run-time script to said web browser via a web-page, which is loaded into web browser after each user login to CCDSVM and start group online meeting.

The run-time script will automatically and periodically perform tasks of refreshing said section-2 and section-3 of web page screen. As mater of the fact, the script can control which section to refresh or refresh all sections in a web page. The frequency of the periodic refreshing can be adjusted by said console support software 6 of CCDSVM depends on the needs of the meeting, which typically can range from 1 to 3 seconds and there is no limitation on this aspect. Also, with the preferred example, said run-time script provided by WCUWE is a JavaScript, however, other type of programming scripts or methods are also possible and there is no limitation on what kind of run-time program shall be used in this invention. In addition, the console support software 6 provides each user the choices of either automatic or manual refreshing their said web-browser 9.

Upon refreshing said section-2 or section-3 of said web-browser 9 screen of each user, a request of updating such screen will be generated and sent from said web-browser 9, to control system 2. The console support software 6 obtains and parses each request to determine what user-group, and which part of said common workspace of said group need to be updated.

Based on information of each parsed request, the console support software 6 of control system 2 retrieves the updated resources information from said common workspace 15 of FIGS. 4A and 4B of said user-group, which includes recent posted files, folders, or messages from each user in said group, and also includes the updated list of files and file-folders or messages after un-post one or more files or folders, or messages by users in same group. Finally, console support software 6 of control system 2 converts/encodes retrieved information of resources and objects into presentable web-format (web-page).

If the request is to update the group messages, the converted information is sent to the section-2 of group common message display area in corresponding user's said web-page/web browser 9. If the request is to update the group common files and folders display area, the converted information is sent to the section-3 of said web-browser 9. Therefore, after refreshing said sections on said web-browser 9, each user can have an identical view of all posted files and folders from section-3 of group common document display area on said browser 9, and can have an identical view of all messages from section-2 of group common message display area on said web-browser 9, which posted by all other users in a same group. Meanwhile said console support software 6 still allow each user kept most of resources information in their own private workspace un-exposed to other users in same group during the online interactive meeting.

For example, User X at his/her said web-browser 9 can see "picture 1" 25 of FIG. 6A posted by user Y in group common file and folder display area but not other information in user Y's private workspace area, and plus the "Doc 1" posted by user X himself. Also, user Y at his/her said web-browser 9 can see "Doc 1" 24 of FIG. 6B posted by user X in group common file and folder display area but not other information in user X's private file and folder display area, and plus the "picture 1" posted by user Y himself.

A difference between a conventional Internet group communication model and the group based communication model described in the present invention is that console support software 6 of control system 2 provides each user to control post or un-post said resources information from user's own private workspace while the conventional Internet communication model are not capable of performing posting/un-posting task. Also, for example, un-posting a previous posted a file or folder information with WCUWE of CCDSVM does not delete the file or file-folder information nor does delete the corresponding physical file or file-folder in user's private workspace while the delete operation with said existing Internet group communication model will completely delete a uploaded file in a group. The dynamic workspace of this invention represents a true beauty of the combined security protection of information and flexibility and efficiency of online meeting provided by WCUWE of CCDSVM to each users and groups in online meeting.

In addition, with a preferred example, since posted information of each files are encoded by said console support software 6 with a web link and displayed in said section-3 of web-browser 9, therefore, each user in a user-group can click on said link to download the files, which provided in the private file and folder area of the private workspace of their peer users in group, from a system where the file is located. For example, user X can download said "picture 1", which may reside on either control system 2 or any provisioned system 3 from user Y and user Y can download said "Doc 1", which also may reside on either control system 2 or provisioned system 3 from user X at same time. This achieves a true peer-to-peer exchanging files on permitted system from permitted users in said user-group. In addition, there is no size limitation on the file size for file to be downloaded, which is a gifted benefit from Internet technology. Again, the web link discussed in present invention just represents a type of reference point to an object for user to access, which can be accessed in a cross network environment. Therefore, the mentioned web link itself shall not be limited to the concept of the web only environment and it also can be referred to a way to reference an object in a non web-based networked environment.

Besides the exampled and understandable method of download, other methods of retrieve peer users' digital documents or contents are also possible by deploying a more efficient proprietary file transfer mechanism to reach the results of said exchanging file. It shall be noted that said method of download is only applicable to said files and does not apply to folder and other said resource information. To get a targeted peer user's entire folder and the underneath files and sub folders, a special files and folder transfer method is provided. Transferring files and file-folders across systems has been discussed in said prior application of "Display multi-layers list item in web browser with supporting of concurrent multi-users" via copy/paste mechanism.

As shown in FIGS. 9A & 9B, and FIGS. 10A & 10B, console support software 6 of control system 2 also provides each user to perform many other tasks during online meeting through said operation menu such as upload, rename, delete, copy/paste and so on without limitation. The upload operation allows each user to dynamically upload files one a time through web-browser 9 from local storage of client system 10 or console system 1 to any permitted file-folder in said user's private workspace on control system 2 or on provisioned system during meeting, and further to be posted to said common space of user-group each user belong to.

The user interactive click driven copy/past operation allows files and folders from permitted folders of permitted provisioned system 3 to be dynamically physically copied to each users' private workspace on control system 2, and the information of said files and folders could further to be displayed in said web-page/browser of each user and to be posted to common workspace of group, which each user belong to in addition to direct posting these file or folders without physical copying over. As matter of the fact, operations provided by console support software 6 of control system 2 have added efficiency to posting or un-posting files and folders for each user depending on the real needs.

Additionally, said console support software 6 provides each user of each group capability of saving the posted messages of common message area 18 of said common workspace of said each group into a file in common file & folder area of said common workspace of each group. Further, the saved file can be viewed, downloaded by each user in each group with same method of posting. Besides whenever there is needs, said console support software modules 6 provide users to reset message area to be empty by removing all message entries in message area of said user-group's common workspace.

The important fact is that the designed WCUWE of CCDSVM has provided concurrent users each from a single web browser anywhere on the network to securely perform permitted various tasks, which could be run concurrent within a single web-browser. Because of console support software 6 of control system 2 let each users have exclusive view for resource objects in their private workspace 16 and in said common workspace 15 of a group each user belong to, and let each user to manage resource objects in their own private space, the multiple users in multiple groups model communication or in 1-to-1 communication can concurrently post or un-post files, folders, messages, or other resource objects without interfere each pair of user in 1-to-1 communication or users between each user-groups. Thus, the workspaces of each user and each group are well protected.

Hence, the console support software 6 of control system 2 provides privileged users to perform tasks of creating multiple users and user-groups on control system, and each group can be assigned with variable size of users for online interactive meeting. The total number of users and the total number of groups, and maximum number of users per groups of WCUWE of CCDSVM can support is an implementation issue and depends on the capacity of the control system 2. The WCUWE of CCDSVM and CCDSVM has been designed with unlimited scalability for both users and provisioned systems 3. On the other hand, the spirit of this invention does not limit to with the boundary issues of WCUWE and CCDSVM.

FIG. 8A and FIG. 8B illustrate that each user-X and user-Y has a different private workspace than others, and each has assigned with different system resources. Regardless each user is a member of group or without any group membership, the console support software 6 of control system 2 also can provide user X and user Y to peer-to-peer instantly post files or folders one a time to each other, or instantly un-post the previous posted files and folders through similar steps as posting or un-posting materials in group online meeting model:

1) Let each user can perform clicking on source of file or folder for post or un-post;
2) Let user select post operation task if user want to post any file or folder through operation menu; or let user select un-post operation task from operation menu if said user like to un-post a previously posted file or folder;
3) upon submitting operation task, let each user provide input to prompt of "who is a targeted user?" provided by said console support software 9, and further submit the selected task;
4) the console support software 6 obtains and parses task information of original user, source of file or folder, type of operation, and other information;
5) If said type of operation is post file or folder, said console support software 6 deposits the information of said source file or folder to said private file and folder area of said private workspace of targeted user. If said operation type is un-post a file or folder, said console support software 6 search a corresponding file or folder information from said private file and folder area of said private workspace of said targeted user to match the source file or folder, if found a match, the corresponding entry of the file or folder is removed from said private file and folder area of said private workspace of targeted user; and
6) Upon each user refreshing the web-page in web-browser 9, the console support software retrieves and convert the updated information in said private file and folder area of private workspace of targeted user into presentable web-format (web-page) and transmit said web-page to web-browser 9 of each user for displaying and viewing.

For example, as shown in FIG. 8A, user X can follow said steps 1) to 3) described above to post his "folder 2" 32 in displayed files and folders area of private working space of user X's web-browser 9 to user Y. As shown in FIG. 8B, upon user Y refreshing his/her said web-browser 9 on a system by walking on any system node or folder node in displayed resource tree, user Y will see said "folder 2" 32 in his/her displayed private file and folder tree of private workspace of user Y shown in FIG. 8C. As matter of the fact, when walking system node and file & folder tree nodes on said web-browser 9, a refreshing web-page screen request is generated and to be handled as described previously or in steps described above. As a results of participating 1-to-1 mode communication with multiple users, a user, such user X, can view and access multiple folders or files posted by one or more users from each of own private workspace. On the other hand, the user X has no permission to delete any resources posted by other users.

In addition to post messages in group-based communication involving parties with two or more users, WCUWE of CCDSVM also provide each user to post message to each other user with non-group based 1-to-1 message model. FIG. 7A and FIG. 7B have shown an example of user X and user Y, who may not be in same user-group, however, the console support software 6 of control system 2 provides each user to share and exchange messages with each other from a three-section web-page in said browser 9.

The section-3 of web-page in said browser 9 let user to work with same said steps of non-group based 1-to-1 posting files and folders or un-posting previously posted files or folders as described previously. The section-3 included in FIGS. 7A and 7B just for a demonstration of how flexible of this invention is to display information under private workspace of each user. Further, the number of sections in the screen layout and the order of each section in web-page display really is not a limitation to this invention.

The section-1 is user message input area together with an additional input field of "To who" due to unlike in group online meeting, the console support software 9 have no knowledge of who is the targeted user in this case. User can posting a message with similar said steps as previous discussed previously of this invention. Nevertheless, unlike with group meeting messaging model, after obtaining and parsing information of the messages from each user, the console support software 6 of control system 2 will deposit the message to both targeted peer user and the original sending user's message areas of private workspace. Further, with same said steps of displaying messages in each user's browser, each user can view both own message and messages from peer user in section-2 of browser.

For example, as shown in FIG. 7A, user X input a message of "msg4 of user X" 30 and type "user Y" in input field of "To who", and then submit the message by clicking on "Send" button. Similar as shown in FIG. 7B, user Y input a message of "Msg3 of user Y" 31, and type "user X" in input field of "To who", and then submit the message. Upon the refreshing web-page at web-browser 9 of each user, the user X will see the message 30 he/she sent and the message 31 from user Y. Also the user Y will see both messages 30 and 31 at same time.

Again, the design choice of three section of web-page display and the order of each section is just a preferred example of implementation for non-group based peer user communication. This invention does not limited by web-screen display layout, for example, a screen display only with said section-1 and section-2 are also possible and so on without limitation, and each section can display one or more same or different resources in one or more user private workspaces or group common workspaces.

The WCUWE of CCDSVM has provided a security hierarchy for members of any team to work together cross multiple locations. With said security hierarchy and said steps of posting or un-posting file and folder, the console support software 6 of control system 2 can specially let only team leader with capability of posting folder or file to be viewed, shared, and accessed by all team members or by an individual member in non-group meeting based environment. In addition, console support software also let each team member to post or un-post his/her file or folders to only a specific peer user one a time in non-group-meeting based environment. Again the files or folders could be on said control system 2 or on any provisioned said provisioned system 3.

It is relatively straightforward for WCUWE of CCDSVM, more specifically the console support software 6, to support massive online users, who do not have account with CCDSVM and can not login CCDSVM yet can view the dynamically posted files, folders, or messages by users with user account of CCDSVM.

In a preferred example, such as shown in FIG. 6E, console support software 6 of control system 2 provides a public web-page to massive online users, who do not have to login CCDSVM. The public web-page, in one embodiment, could be layout with two major sections with section-1 to display messages in sharable message area in a designated user-group's common workspace while the section-2 to display file or folders in sharable file or folder area in said designated user-group's common workspace.

For users belong to same said designated user-group, each user from a web-browser on any system of said network to login to CCDSVM and get said group online meeting web-page as shown in FIG. 6A for user X and FIG. 6B for user Y. Further as described previously each user in said group can instantly post message to said message area of designated user-group's common workspace, or post one file or folder to the sharable file and folder area in designated user-group's common workspace, which associated with said public web page. Also, each user in user-group can instantly perform un-post the previously posted files or folders task, which results removing the corresponding file or folder entry in file and folder area in designated user-group's common workspace by said console support software 6 of the control system 2, or un-post the previously posted messages from common message area of common workspace of said user-group.

Meanwhile as previously described and as shown in FIG. 6E, the public web-page can be displayed in the browser 9, which may located on one or more public display systems or on each public online user's native system, can be dynamically updated and further to be viewed by the massive online public users with the same pace and synchronized with identical contents as dynamically displaying in said section-2 and section-3 of said web-page/browser 9 displayed in group online meeting as shown in FIG. 6A and FIG. 6B. Again, said two sections of web-page display layout is a preferred example and it does not limit this invention because with this invention other layout is also possible, for example, it may be desired to have web-page layout only contains one section, which is either for messages or file or folder's or for both messages or files display depending on the application's need.

As shown in FIG. 8A, FIG. 8B, and FIG. 8C, if people who had participated multiple sessions of group based or non-group based peer-to-peer communication and has posted or un-posted many messages, files and file-folders may often do not remember how many materials has been posted for sharing. For example, as shown in FIG. 8A, user X can select "folder 2" 32, select post on operation menu, and provide target "user Y" to share "folder 2" 32. As show in FIG. 8C, user Y can see "Folder 2" 32 of user X in web-browser of user Y after user X post "Folder 2" 32. If user X select various files or folders for other dozen people to post and share, user X will have difficult time to remember what has been shared and who are targeted users. As shown in FIG. 11, the console support software 6 of control system 2 can provide each user, user X for example, a central view of a control list of how many messages, files or file-folders being posted by him or her and to who.

As shown in FIG. 11 of personal share management, in view of user X's web-browser 9, an entry of posted "Folder 2" 30 is listed at bottom of said control list and it is posted/shared to user Y. Further, said console support software 6 can provide each user selectively un-post the previously posted files and folders by clicking on the "delete shared?" of operation menu for corresponding entries in the shared list of center view web-page and further to generate a un-post operation task. For example, user X clicks on "delete share?" to un-post "Folder 2" 32. Thereafter, as described before, said console support software 6 of control system 2 will execute the un-post task. Further upon refreshing the targeted user Y's web-page/web-browser, in stead of seeing "Folder 2" 32 as shown in FIG. 8C, user Y will see an updated view of said of web-page as shown in FIG. 8B, where the "Folder 2" 30 has been removed. The operation menu for "delete share?" depicted here just for example and it could be displayed in any other form.

In addition to let original user in a group to control the un-posting file or folder in group based communication, the console support software 6 of control system2 may also provide a privileged user to un-post the previously posted files or file folders by other users in said displayed file and file-folder section of said web-page. To support this capability, said console support software 6 will provide an operation menu to associate with said displayed files and folders in said display section, further to allow privileged user to perform similar un-post operation. After receiving the un-post operation, the console support software 6 will perform similar said searching for selected file or folder in the group file and folder area 19 of FIG. 4B of group common workspace of said group, if there is match the corresponding entry will be deleted. Also, the file and folder section of web-page/web-browser can be refreshed accordingly as described before.

The present invention can apply to update web contents for massive web portal in enterprises and personal communication. In one example, the FIGS. 6A and B may represent an internal portal web page, encoded with information in common workspace of the group-I, and the FIG. 6E web page display may represent a external portal of that group. The present invention has provided synchronization between these two internal and external web pages in real-time.

In one embodiment, a web page screen of a news portal may divided into multi-sections including sports section, medical section, education section, entertainment section, financial section, traveling and vacation section, and technology section etc. without limit. With the CCDSVM, each different section can be assigned to each different corresponding group, which is dedicated for updating the news in the section. For example, 5 sports journalists in a sports group scattering around the world can be assigned to update the sports news section instantly at anytime and anyplace, where the sports section is only associated with sports group's common workspace and can be updated and refreshed independently in the web page via a run-time script. In another example, a financial group has 4 journalists being assigned to update the financial section of the web page, which is only associated with financial group's common workspace, and so forth without limits. Of course, the rest of sections can also be assigned to each dedicated group of journalists.

In another embodiment, a retailer's portal may have multiple sections of web page layout for displaying hundreds or even thousands of products, where each section may be dedicated to each type of products. By assigning each section to a dedicated group of one or more users, the contents of each section can be much secure and efficiently updated because more users can concurrently working on each section of each web page for entire web pages of any portal without interrupt each others.

Further, each section can be dedicated to encode and display one type of resources from each user in corresponding area of group common workspace or encode and display with mixed type of resources of from multiple areas of a group common workspaces such as mixed with photo-picture and text messages and others, or mixed with streaming video and text messages.

Instead of encoding resources of one or more users' private workspaces into each corresponding section of a web page indirectly via each corresponding group's common workspace, in which each user are the members as described in prior embodiment, each section of a web page can be encoded directly with resources information in one or more users' private workspaces. To accomplish this, the console support software modules 6 of the control system 2 can keep a mapping list between each section and the associated one or more users' private workspaces for each web page. In addition, the console support software 6 can facilitate each user an alternative post operation and an alternative un-post operation to support updating the contents of the assigned section of a web page. Therefore, instead of facilitating each user posting resources information into the user's group's workspace or withdrawing resource information from the user's group's workspace, it facilitating user to tag the resource in his private workspace for posting directly to the assigned section, or to tag the previously tagged of posted resource for withdrawing. In one embodiment, the tagged information can be kept in a list and be store in a dedicated place in the user's private workspace, or a central controlled file-folder that console support software 6 can easy to pick up. Therefore, during generating the targeted web page, it will encoding each section of web page according to the mapped information combined with each user's tagged information for updating web contents. Although, this is not as robust as post and un-post operations, yet it reduced the usage for group common workspace.

The management for larger volumes of web contents for a complex web portal will become much efficient because it divides the larger amount of works into one or more small jobs for each corresponding small section of each web page of a web portal. Therefore, each section can be parallel updated by one or more users yet the updating is independent and without interfering other sections. Second, it is much secure since each section is restricted to be updated by limited users. Also, with this invention, the updating does not require any hardcode for each section due to the nature of posting and withdrawing technology introduced in present invention.

Having briefly described embodiments of the web based network environment in which the present invention operates, FIG. 12 illustrates an example of a computer system 1200, which is an exemplary client system 10, provisioned system 3, control system 2, or console system 1 in which the features of the present invention may be implemented. Process of the web based information exchange can be implemented in any processor-based computer system, such as a PC, a workstation, or a mainframe computer. It will be apparent to those of ordinary skill in the art that other alternative computer system architectures may also be employed.

Referring back to FIG. 12, computer system 200 includes a processing unit 201, an interface bus 211, and an input/output ("IO") unit 220. Processing unit 201 includes a processor 202, a main memory 204, a system bus 211, a static memory device 206, a bus control unit 205, a mass storage memory 207, and a web information exchange module 230. Bus 211 is used to transmit information between various components and processor 202 for data processing. Processor 202 may be any of a wide variety of general-purpose processors or microprocessors such as Pentium™ microprocessor, Motorola™ 68040, or Power PC™ microprocessor.

Main memory 204, which may include multiple levels of cache memories, stores frequently used data and instructions. Main memory 204 may be RAM (random access memory), MRAM (magnetic RAM), or flash memory. Static memory 206 may be a ROM (read-only memory), which is coupled to bus 211, for storing static information and/or instructions. Bus control unit 205 is coupled to buses 211-212 and controls which component, such as main memory 204 or processor 202, can use the bus. Bus control unit 205 manages the communications between bus 211 and bus 212. Mass storage memory 207, which may be a magnetic disk, an optical disk, hard disk drive, floppy disk, CD-ROM, and/or flash memories for storing large amounts of data. Web based information exchange 230, in one embodiment, is a network control component for facilitating information exchange over the Web. It should be noted that web based information exchange 230 could be software or hardware or a combination of software and hardware components and modules. In one embodiment, it comprises video and audio recoding and playback components including digital camera or video or audio encoding and playing back PCI cards such that the on-the-fly recoded streaming video on the computer system 200 can be displayed into each user's web browser or other viewing mechanism on another remote computer system 200 via communication link over various network during online information exchanging.

I/O unit 220, in one embodiment, includes a display 221, keyboard 222, cursor control device 223, and communication device 225. Display device 221 may be a liquid crystal device, cathode ray tube ("CRT"), touch-screen display, or other suitable display device. Display 221 projects or displays images of a graphical planning board. Keyboard 222 may be a conventional alphanumeric input device for communicating information between computer system 200 and computer operator(s). Another type of user input device is cursor control device 223, such as a conventional mouse, touch mouse, trackball, or other type of cursor for communicating information between system 200 and user(s).

Communication device 225 is coupled to bus 211 for accessing information from remote computers or servers, such as server 104 or other computers, through wide-area network 102. Communication device 225 may include a modem or a network interface device, or other similar devices that facilitate communication between computer 200 and the network. Computer system 200 may be coupled to a number of servers via a network infrastructure such as the infrastructure illustrated in FIG. 1.

The present invention has been described in considerable details with reference to certain examples. However, other versions and examples are also possible, therefore, the spirit of this invention shall not be limited to these examples and/or embodiments. Also, the claims of this invention will label with numbering and in most cases, the numbering does not represent any sequence or order unless specifically described as the steps of a method.

What is claimed is:

1. A computing device comprising a processor, memory and program code which, when executed by the processor, configures the device to:
    (i) display a user interface to each of a first user and a second user to share information, wherein each of the user interfaces comprises, for each of the first and second users, (a) a private section configured to display information about files or folders available for the user to share and (b) a common section configured to display information about files or folders shared with the user;
    (ii) share a file or folder selected, from the available files or folders, by the first user with the second user by (a) allowing the first user to identify the file or folder in the private section on the first user's interface, which is not viewable by the second user, (b) unlocking a protection mechanism of the file or folder to allow access to the second user, (c) storing information about the file or folder, without the content of the file or folder, in a common work place accessible to both the first user and the second user, and (d) displaying information about the file or folder in the common section on the second user's interface, wherein the second user can access the file or folder through the displayed information; and
    (iii) stop sharing of a file or folder to the second user that the first user has previously shared with the second user by (a) deleting information about the file or folder displayed in the common section on the second user's interface, (b) deleting information about the file or folder that has been stored in the common work place, and (c) locking the protection mechanism to rescind access to the second user.

2. The computing device of claim 1, wherein each of the user interfaces further comprises, for each of the first and second users, (c) a private message section configured to allow the user to input a message and (d) a common message section configured to display messages shared with the user.

3. The computing device of claim 2, wherein the program code further configures the device to
 (iv) share a message by the first user with the second user by (a) receiving a message from the first user, via the private message section on the first user's interface, which is not viewable by the second user, (b) storing the message in the common work place accessible to both the first user and the second user, and (c) displaying the message in the common message section on the second user's interface; and
 (v) delete a message that the first user has previously shared with the second user by (a) identifying the message in the common work place and in the common message section on the second user's interface and (b) deleting the message from the common work place and the common message section.

4. The computing device of claim 1, wherein the user interface is presented on a web browser.

5. The computing device of claim 1, wherein the first user and the second user are members of a user group, and the file or folder shared with the second user is also displayed in the common section of the user interfaces of all users in the user group, and is accessible to all users of the user group.

* * * * *